United States Patent
Norimatsu

(10) Patent No.: US 8,553,290 B2
(45) Date of Patent: Oct. 8, 2013

(54) PLATE-MAKING APPARATUS AND PRINTING PLATE MANUFACTURING METHOD

(75) Inventor: Masashi Norimatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 767 days.

(21) Appl. No.: 12/654,775

(22) Filed: Dec. 31, 2009

(65) Prior Publication Data
US 2010/0173237 A1 Jul. 8, 2010

(30) Foreign Application Priority Data
Jan. 5, 2009 (JP) ................................. 2009-000326

(51) Int. Cl.
H04N 1/40 (2006.01)
(52) U.S. Cl.
USPC .......................................... 358/3.29; 358/296
(58) Field of Classification Search
CPC ....................................................... B41N 3/003
USPC ................. 358/1.9, 2.1, 3.29, 400, 406, 500, 358/504, 496–497, 296; 347/129, 131–135, 347/141
See application file for complete search history.

(56) References Cited

U.S. PATENT DOCUMENTS
2007/0248907 A1 10/2007 Van Denend et al.

FOREIGN PATENT DOCUMENTS

| DE | 195 44 502 C1 | 5/1997 |
| DE | 101 13 927 A1 | 9/2002 |
| DE | 101 29 874 A1 | 1/2003 |
| JP | 11-028586 A | 2/1999 |
| JP | 2002-239760 A | 8/2002 |
| JP | 2006-239702 A | 9/2006 |
| JP | 2007-007699 A | 1/2007 |
| WO | WO 2006/130601 A1 | 12/2006 |

*Primary Examiner* — Thomas D Lee
*Assistant Examiner* — Stephen M Brinich
(74) *Attorney, Agent, or Firm* — Jean C. Edwards; Edwards Neils PLLC

(57) ABSTRACT

The plate-making apparatus according to an aspect of the present invention includes an exposure head which engraves a surface of a plate material by emitting a light beam toward the plate material; a scanning device which performs exposure scanning by relatively moving the plate material and the exposure head; a correction profile generation device which generates a correction profile for correcting an emission amount of the light beam emitted by the exposure head according to a characteristic difference of the plate material; and an exposure control device which, when a correction profile for a plate material to be used is generated by the correction profile generation device, uses the correction profile for the plate material to be used to control the emission amount of the light beam.

11 Claims, 26 Drawing Sheets

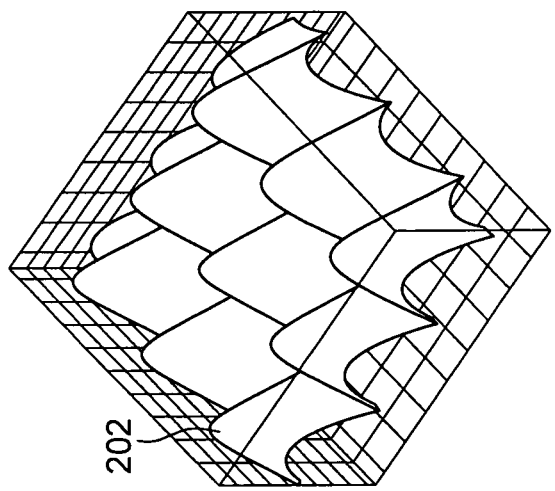
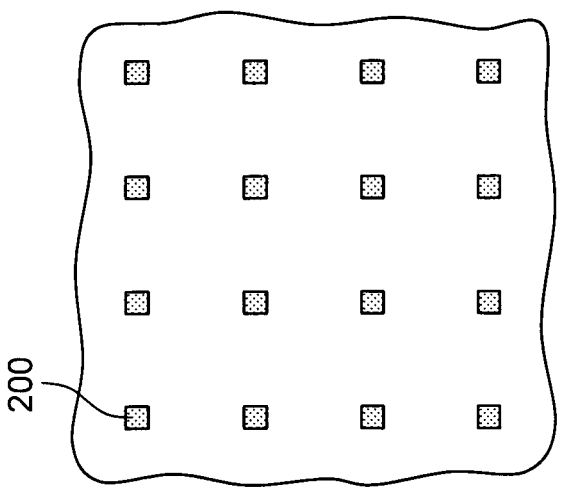

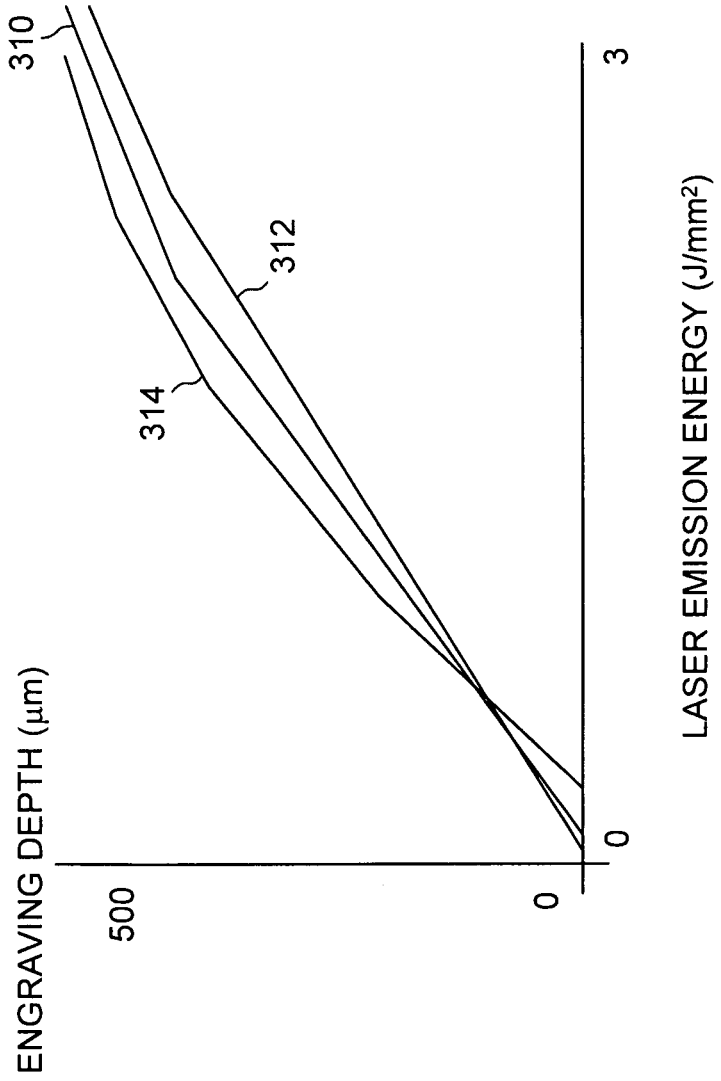

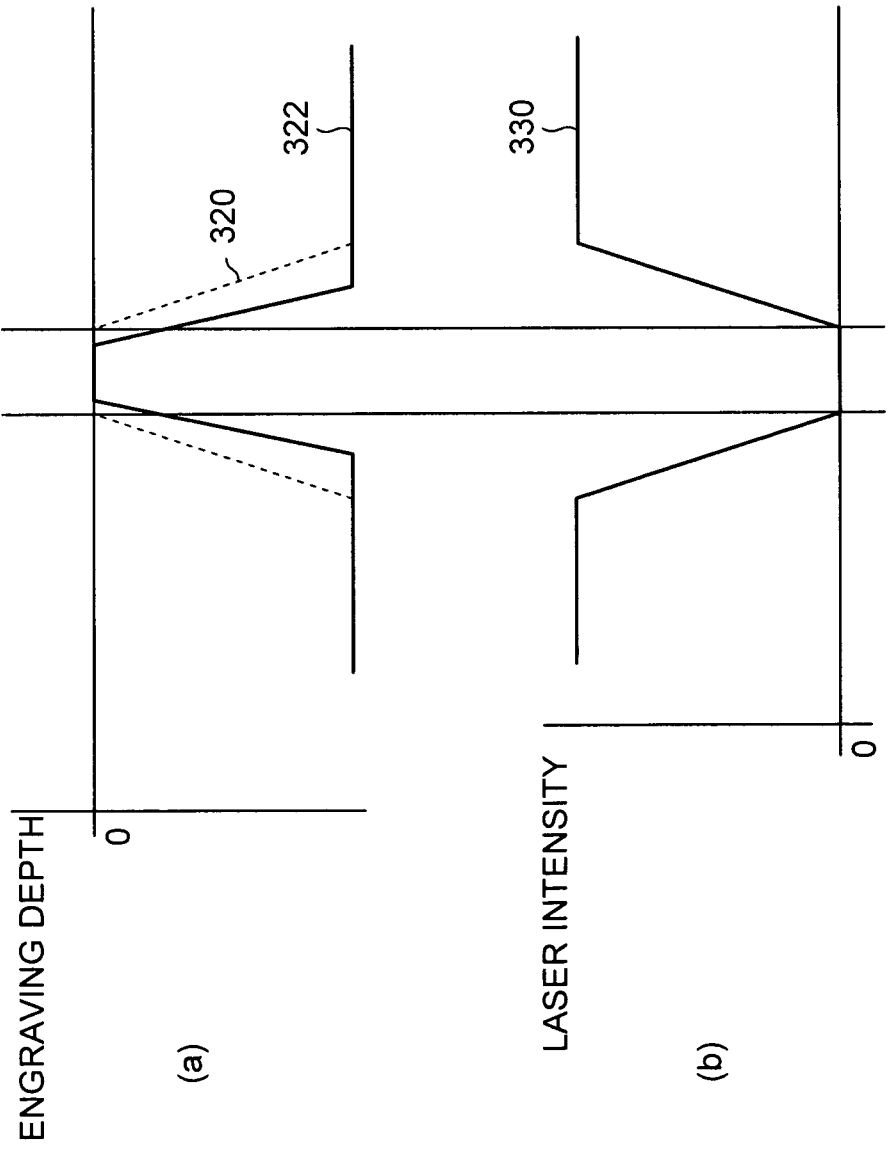

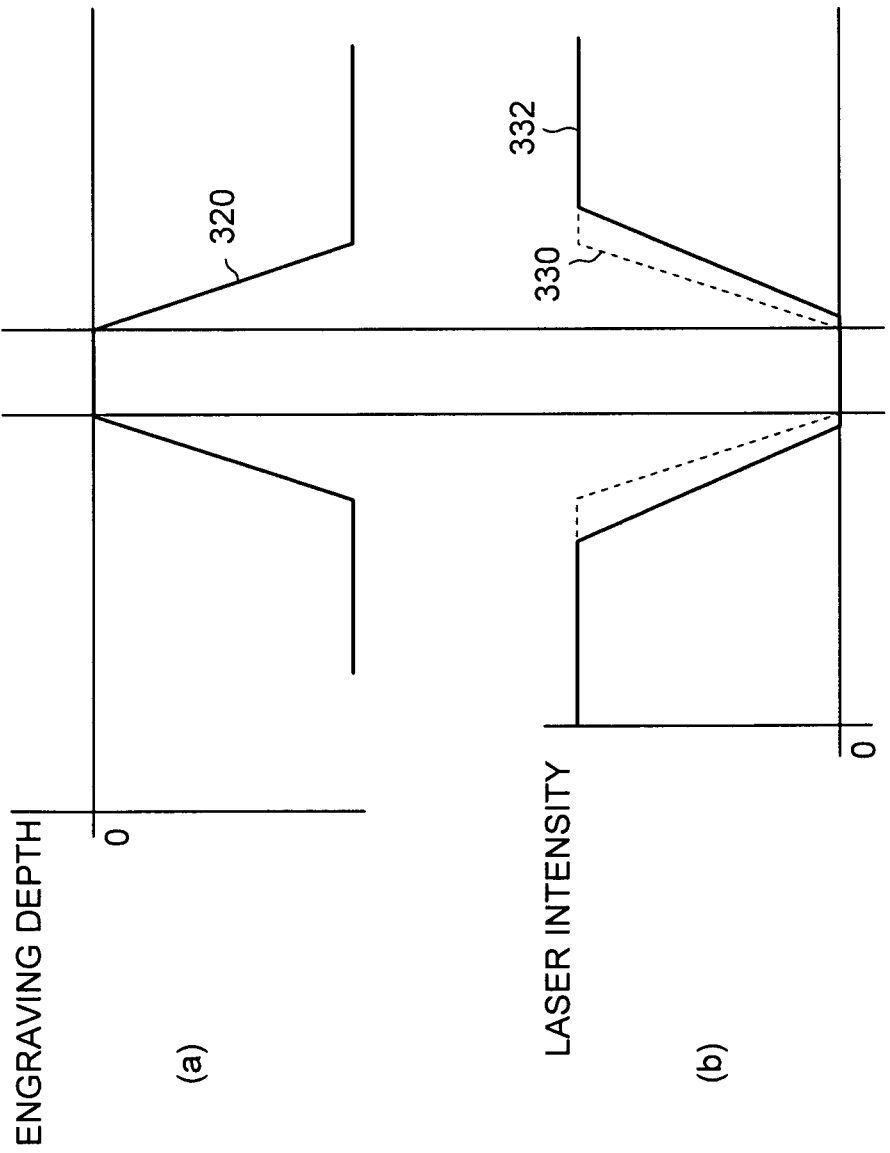

PLATE-MAKING APPARATUS AND PRINTING PLATE MANUFACTURING METHOD

CROSS-REFERENCE TO RELATED APPLICATIONS

The present application claims priority from Japanese Patent Application No. 2009-000326, filed Jan. 5, 2009, the contents of which are herein incorporated by reference in their entirety.

BACKGROUND OF THE INVENTION

1. Field of the Invention

The present invention relates to a plate-making apparatus and a printing plate manufacturing method, and more particularly, to a multi-beam exposure technique suitable for manufacturing a printing plate such as a flexographic plate and a printing plate manufacturing technique applying this.

2. Description of the Related Art

Conventionally, there has been known a plate-making apparatus using a plate material such as a flexo, which rotates a drum in a main scanning direction, on an outer peripheral surface of which the plate material is mounted as well as scans laser beams in a sub-scanning direction according to image data to perform laser engraving on the plate material. The laser engraving is a plate-making method having high degree of freedom for a three-dimensional shape in that an arbitrary three-dimensional shape can be set using parameters such as the size, depth, inclination, and inclined expansion of a top portion for each pixel. In general, when a flexographic material is engraved, the engraved shape is often specified. For example, the size of the top portion is determined by the document (image data), but it is difficult to obtain the depth, inclination, and inclined expansion thereof simply from the document. Therefore, the user often adjusts the depth, inclination, and inclined expansion thereof according to the type and the hardness of the plate material (paper, heavy paper, film, etc.) and the type of the document (line drawing, natural image, etc.).

Japanese Patent Application Laid-Open No. 2006-239702 discloses a laser machining apparatus using a plurality of laser emission units. In order to prevent variations occurring in a machined state due to individual differences in each laser emission unit and the like, calibration information for correcting laser intensity deviation to a workpiece is stored. The calibration information is used to correct a command signal used to control the emission intensity of each laser emission unit.

SUMMARY OF THE INVENTION

However, the flexographic materials often differ in characteristic (e.g., sensitivity of the plate material) depending on the production lot even if the flexographic materials are of the same type from the same manufacturer. Therefore, a laser emission adjusted by a standard plate material may not work if the plate material lot is different, and thus the desired engrave shape may not be obtained.

Japanese Patent Application Laid-Open No. 2006-239702 does not disclose the technique for solving the above problem since the technique does not consider the difference in characteristic due to the plate material lot although the technique corrects the variations in laser beams emitted from the laser emission units.

In view of the above circumstances, the present invention has been made, and an object of the present invention is to provide a plate-making apparatus and a printing plate manufacturing method capable of forming a desired engraved shape by avoiding the variations occurring in the engraved shape due to the difference in characteristic of the plate material.

In order to achieve the above object, the plate-making apparatus in accordance with the present invention includes an exposure head which engraves a surface of a plate material by emitting a light beam toward the plate material; a scanning device which performs exposure scanning by relatively moving the plate material and the exposure head; a correction profile generation device which generates a correction profile for correcting an emission amount of the light beam emitted by the exposure head according to a characteristic difference of the plate material; and an exposure control device which, when a correction profile for a plate material to be used is generated by the correction profile generation device, uses the correction profile for the plate material to be used to control the amount of the light beam.

According to the present invention, a correction profile is generated corresponding to a characteristic difference of a plate material used as a printing plate, and the correction profile is used to correct the emission amount of the light beam emitted from the exposure head to engrave the plate material. Therefore, a fine shape can be engraved as intended even if the plate material is changed due to lot differences.

BRIEF DESCRIPTION OF THE DRAWING

FIGS. 12A to 12F each schematically illustrate an example of generating a three-dimensional shape from binary data;

FIGS. 13A and 13B each explain the relationship between a dot arrangement and the three-dimensional shape (for a plurality of dots);

FIG. 20 illustrates a difference in characteristic curve due to a difference in the plate material lot;

FIG. 21 explains a state in which a deviation from a target shape occurs;

FIG. 22 explains a correction when the deviation occurs;

DETAILED DESCRIPTION OF THE PREFERRED EMBODIMENTS

Hereinafter, embodiments of the present invention will be described in detail according to the accompanying drawings.

<Configuration Example of the Plate-Making Apparatus>

Figure 1:
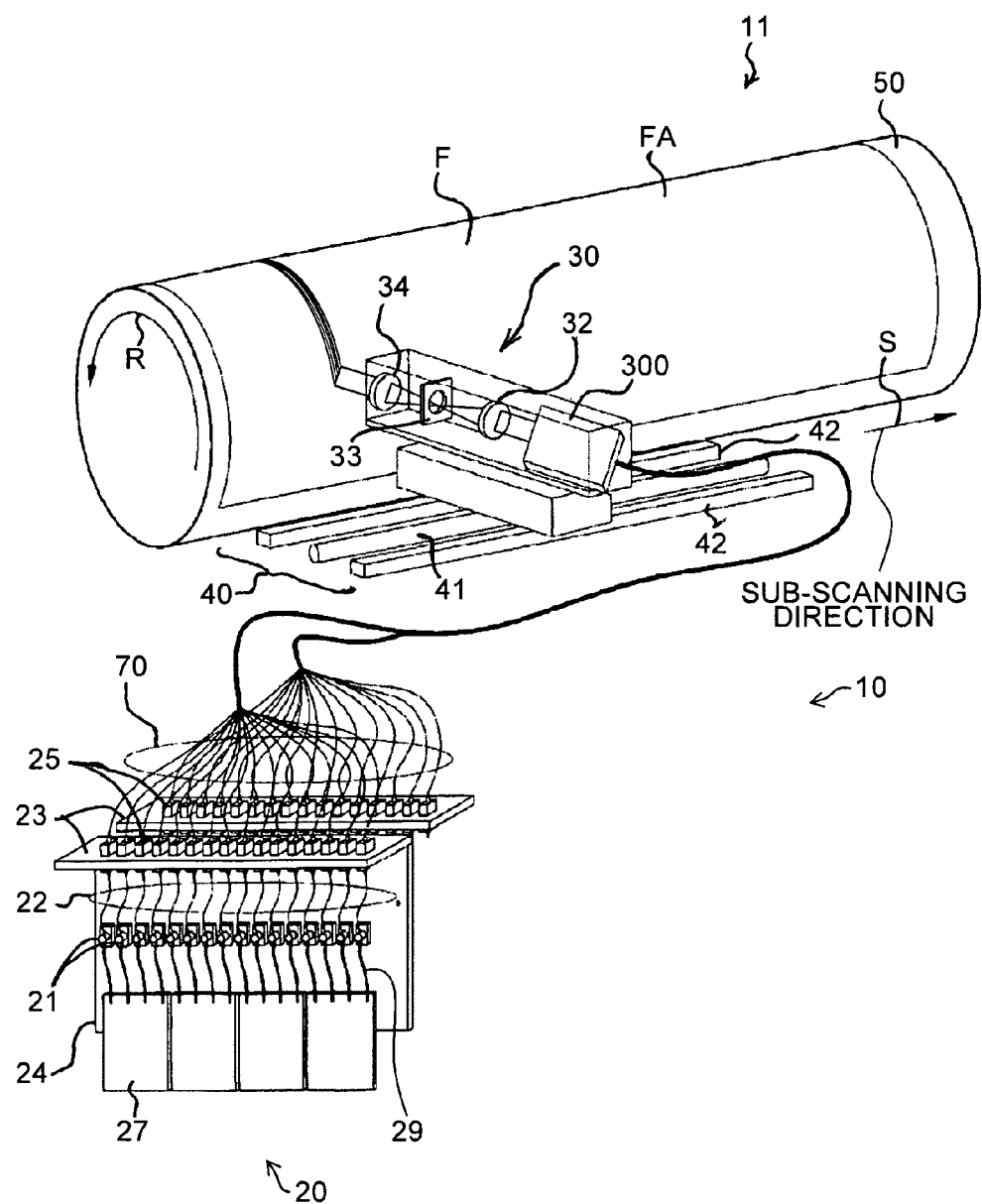
FIG. 1 illustrates a configuration of a plate-making apparatus to which the plate-making apparatus in accordance with an embodiment of the present invention is applied.

FIG. 1 illustrates a configuration of a plate-making apparatus (laser machining apparatus) in accordance with an embodiment of the present invention. The illustrated plate-making apparatus 11 fixes a sheet-shaped plate material F on an outer peripheral surface of a cylindrical drum 50; rotates the drum 50 in a direction indicated by an arrow R in FIG. 1 (in a main scanning direction); emits a plurality of laser beams to the plate material F from an exposure head 30 of a laser recorder 10 according to image data of an image to be engraved (recorded) on the plate material F; and generates the exposure head 30 scan at a predetermined pitch in a sub-scanning direction (in a direction indicated by an arrow S in FIG. 1) perpendicular to the main scanning direction to engrave (record) a two-dimensional image on a surface of the plate material F at a high speed. Here, description is made by taking an example of engraving a rubber plate or plastic plate for flexographic printing.

The laser recorder 10 used in the plate-making apparatus 11 of the present embodiment is configured to include a light source unit 20 which generates a plurality of laser beams; an exposure head 30 which emits the plurality of laser beams generated by the light source unit 20 to the plate material F; and an exposure head moving portion 40 which moves the exposure head 30 along the sub-scanning direction.

The light source unit 20 includes a plurality of semiconductor lasers 21 (a total of 32). Light from each semiconductor laser 21 is transmitted to an optical fiber array portion 300 of the exposure head 30 each separately through optical fibers 22 and 70.

According to the present embodiment, a broad-area semiconductor laser (wavelength of 915 nm) is used as the semiconductor laser 21, and these semiconductor lasers 21 are arranged side by side on a light source substrate 24. Each semiconductor laser 21 is coupled to one end of each optical fiber 22, and the other end of the each optical fiber 22 is connected to an adapter of each SC-type optical connector 25.

An adapter substrate 23 supporting the SC-type optical connector 25 is mounted perpendicularly to one end of the light source substrate 24. An Ld driver substrate 27 having an LD driver circuit (not illustrated in FIG. 1, but illustrated by reference number 26 in FIG. 7) driving each semiconductor laser 21 is mounted on the other end of the light source substrate 24. Each semiconductor laser 21 is connected separately to the corresponding Ld driver circuit through a respective wiring member 29. Thus, each semiconductor laser 21 is driven and controlled separately.

Note that according to the present embodiment, in order to obtain a laser beam with a high output power, a multi-mode optical fiber with a relatively large core diameter is applied to each optical fiber 70. Specifically, according to the present embodiment, an optical fiber with a core diameter of 105 μm is used. Moreover, the semiconductor laser 21 uses an optical fiber with a maximum output power of about 10 W. Specifically, for example, an optical fiber with a core diameter of 105 μm and with an output power of 10 W (6398-L4) available from JDS Uniphase Corporation can be used.

Meanwhile, the exposure head 30 includes an optical fiber array portion 300 which combines and emits each laser beam emitted from a plurality of semiconductor lasers 21. A light emitting portion (not illustrated in FIG. 1, but illustrated by reference number 280 in FIG. 2) of the optical fiber array portion 300 has a structure where each emission end of the 32 optical fibers 70 guided from each semiconductor laser 21 is arranged in a line (see FIG. 3).

In addition, the exposure head 30 includes a collimator lens 32, an opening member 33, and an imaging lens 34 which are arranged side by side in series from a light emitting portion side of the optical fiber array portion 300. An imaging optical system is configured by a combination of the collimator lens 32 and the imaging lens 34. The opening member 33 is arranged in such a manner that the opening thereof is placed in a far-field position viewed from the optical fiber array portion 300 side. This configuration can have an equivalent effect of light limitation on all the laser beams emitted from the optical fiber array portion 300.

The exposure head moving portion 40 includes a ball screw 41 and two rails 42, the longitudinal direction of which is arranged along the sub-scanning direction. When a sub-scanning motor (not illustrated in FIG. 1, but illustrated by reference number 43 in FIG. 7) which rotatably drives the ball screw 41 is operated, the exposure head 30 disposed on the ball screw 41 can be moved in the sub-scanning direction in a state of being guided on the rails 42. In addition, when a main scanning motor (not illustrated in FIG. 1, but illustrated by reference number 51 in FIG. 7) is operated, the drum 50 can be rotatably driven in a direction indicated by an arrow R in FIG. 1, thereby performing the main scanning.

Figure 2:
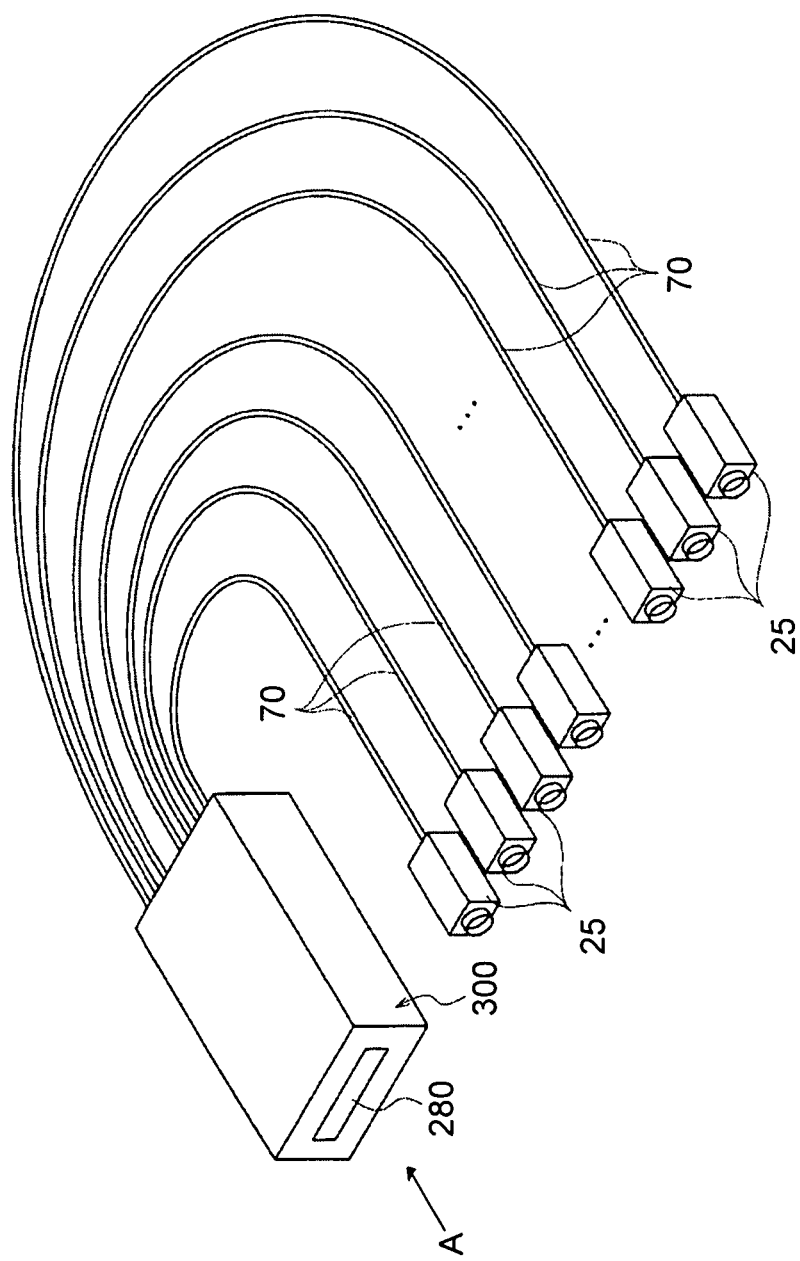
FIG. 2 illustrates a configuration of an optical fiber array portion disposed in an exposure head.
Figure 3:
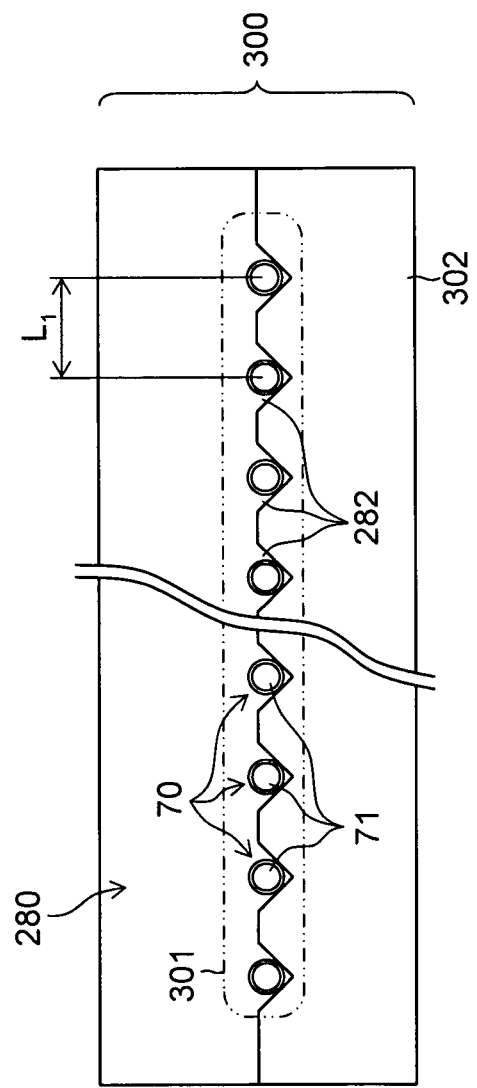
FIG. 3 is an enlarged view of a light emitting portion of the optical fiber array portion.

FIG. 2 illustrates a configuration of an optical fiber array portion 300, and FIG. 3 is an enlarged view of a light emitting portion 280 thereof (viewed from an arrow A of FIG. 2). As illustrated in FIG. 3, the light emitting portion 280 of the optical fiber array portion 300 is configured in such a manner that equally spaced 32 optical fibers 70 each emitting light and having a core diameter of 105 μm are arranged linearly side by side.

The optical fiber array portion 300 has a base pedestal (V-groove substrate) 302. The base pedestal 302 is formed in such a manner that the same number of semiconductor lasers 21, namely, 32 V-character grooves 282 are adjacent to each other and spaced at a predetermined distance on one surface thereof. An optical fiber end 71 of the other end of each optical fiber 70 is fitted one by one to each V-character groove 282 of the base pedestal 302. By doing so, an optical fiber end group 301 is configured to be linearly arranged side by side. Consequently, a plurality of (32) laser beams are emitted simultaneously from the light emitting portion 280 of the optical fiber array portion 300.

Figure 4:
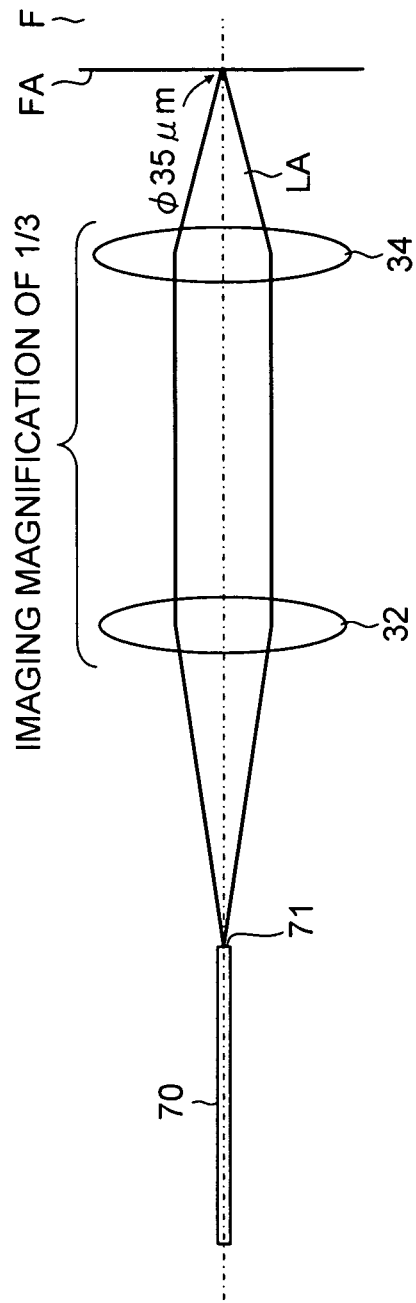
FIG. 4 illustrates an outline of an imaging optical system of the optical fiber array portion.

FIG. 4 illustrates an outline of an imaging optical system of the optical fiber array portion 300. As illustrated in FIG. 4, an imaging device including the collimator lens 32 and the imaging lens 34 is used to cause the light emitting portion 280 of the optical fiber array portion 300 to produce an image in the vicinity of an exposure surface FA of the plate material F at a predetermined imaging magnification. According to the present embodiment, the imaging magnification is assumed to be ⅓. Accordingly, a laser beam LA emitted from the optical fiber end 71 with a core diameter of 105 μm has a spot diameter of φ 35 μm.

Figure 5:
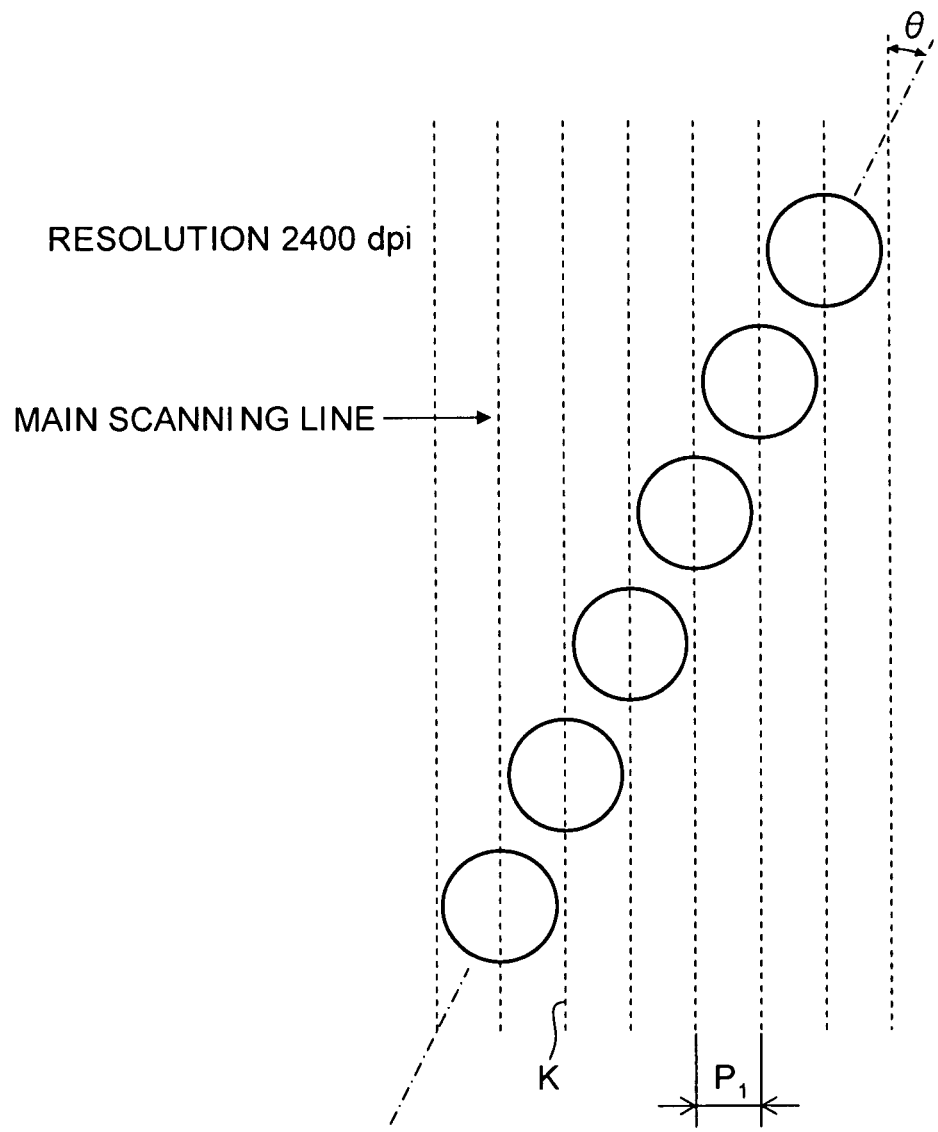
FIG. 5 illustrates an example of disposing an optical fiber and explains the relationship between the optical fiber and a scanning line in the optical fiber array portion.

In the exposure head 30 having such an imaging system, an adjacent fiber spacing (LI in FIG. 3) of the optical fiber array portion 300 described in FIG. 3 and an inclination angle (angle θ in FIG. 5) in the array direction of the optical fiber end group 301 when the optical fiber array portion 300 is fixed are designed as needed. Thereby, as illustrated in FIG. 5, a distance P1 between the scanning lines (main scanning lines) K of the laser beams emitted from the optical fibers disposed in an adjacent position to each other can be set to 10.58 μm (corresponding to a resolution of 2400 dpi in the sub-scanning direction).

The above configured exposure head 30 enables simultaneous scanning and exposure of 32 lines of range (one swath).

Figure 6:
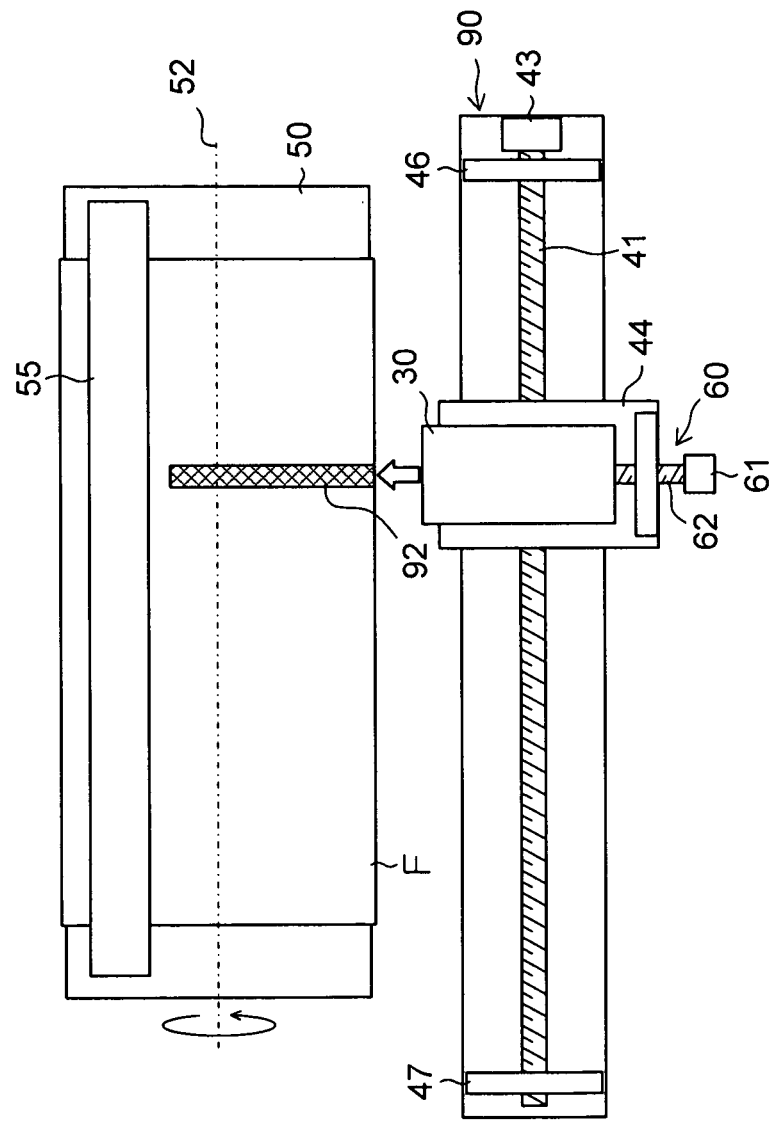
FIG. 6 is a plan view illustrating an outline of a scanning exposure system in the plate-making apparatus of the present embodiment.

FIG. 6 is a plan view illustrating an outline of a scanning exposure system in the plate-making apparatus 11 illustrated in FIG. 1. The exposure head 30 includes a focus position change mechanism 60 and an intermittent feeding mechanism 90 toward the sub-scanning direction.

The focus position change mechanism 60 includes a motor 61 and a ball screw 62 which move the exposure head 30 back and forth with respect to a surface of the drum 50. The focus position can be moved about 300 μm in about 0.1 second by controlling the motor 61. The intermittent feeding mechanism 90 is a component of the exposure head moving portion 40 described in FIG. 1. As illustrated in FIG. 6, the intermittent feeding mechanism 90 includes a ball screw 41 and a sub-scanning motor 43 turning this screw. The exposure head 30 is fixed to a stage 44 on the ball screw 41. The exposure head 30 can be intermittently fed in a direction of an axis line 52 of the drum 50 by one swath and an adjacent swath in about 0.1 second by controlling the sub-scanning motor 43.

Note that in FIG. 6, reference numerals 46 and 47 designate bearings which rotatably support the ball screw 41. The reference numeral 55 designates a chuck member which chucks the plate material F on the drum 50. The chuck member 55 is located in a non-recording region where exposure (recording) by the exposure head 30 is not performed. While the drum 50 is being rotated, 32 channels of laser beams are emitted from the exposure head 30 to the plate material F on the rotating drum 50. Thereby, 32 channels (one swath) of exposure range 92 are exposed tightly to produce one swath width of engraving (image recording) on the surface of the plate material F. Then, when the drum 50 is rotated and the chuck member 55 passes in front of the exposure head 30 (in the non-recording region of the plate material F), the exposure head 30 is intermittently fed in the sub-scanning direction to expose a next one swath. Thus, a desired image is formed on the entire surface of the plate material F by repeating exposure scanning by intermittent feeding in the sub-scanning direction.

According to the present embodiment, a sheet-shaped plate material F is used, but a cylindrical recording medium (sleeve-type) can be used.

<Configuration of the Control System>

Figure 7:
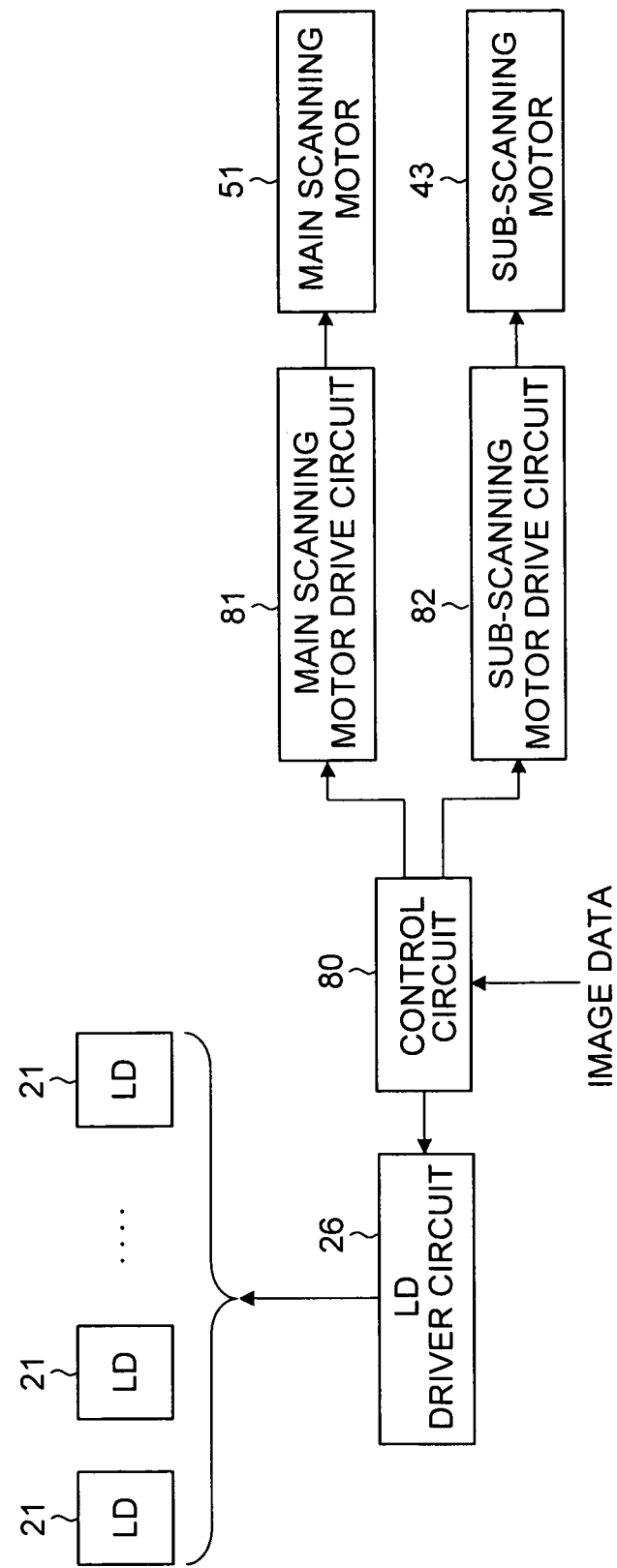
FIG. 7 is a block diagram illustrating a configuration of a control system of the plate-making apparatus of the present embodiment.

FIG. 7 is a block diagram illustrating a configuration of the control system of the plate-making apparatus 11. As illustrated in FIG. 7, the plate-making apparatus 11 includes an LD driver circuit 26 which drives each semiconductor laser 21 according to data of a two-dimensional image to be engraved; a main scanning motor 51 which rotates the drum 50; a main scanning motor drive circuit 81 which drives the main scanning motor 51; a sub-scanning motor drive circuit 82 which drives the sub-scanning motor 43; and a control circuit 80. The control circuit 80 controls the LD driver circuit 26, and each motor drive circuit (81 and 82).

Image data indicating an image to be engraved (recorded) on the plate material F is fed to the control circuit 80. The control circuit 80 uses this image data to control driving the main scanning motor 51 and the sub-scanning motor 43, as well as to individually control an output of each semiconductor laser 21 (on/off control and power control of the laser beam). Note that the device for controlling the output of the laser beams is not limited to the embodiment of controlling the amount of light emitted from the semiconductor laser 21, but instead of this device or in combination of this device, an optical modulation device such as an acoustic optical modulator (AOM) may be used.

<Outline of the Plate-Making Apparatus and the Printing Plate Manufacturing Method>

The plate-making apparatus 11 in accordance with the present embodiment produces an engraved test plate (test chart); measures the engraved test plate; generates a correction profile if a correction is required because the engraved test plate cannot be produced as intended; and corrects the amount of laser based on the correction profile to perform actual engraving.

Such a configuration allows a desired engraved shape to be easily obtained by considering individual differences in each plate material (differences in characteristics). Hereinafter, the plate-making apparatus and the printing plate manufacturing method in accordance with the present embodiment will be described in detail.

<Detail of the Control System>

Figure 8:
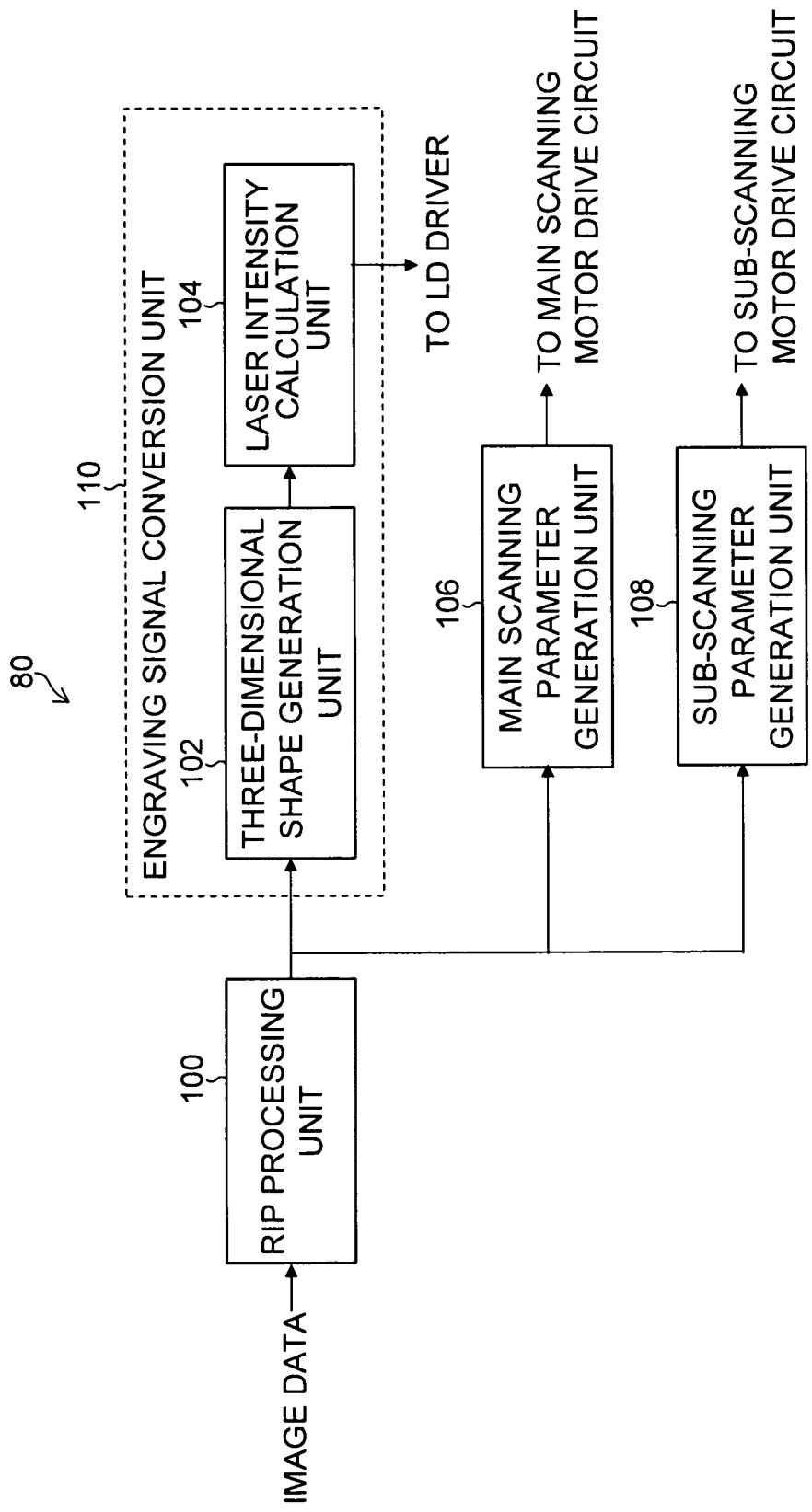
FIG. 8 is a block diagram illustrating a configuration of the control circuit illustrated in FIG. 7.

FIG. 8 is a block diagram illustrating a configuration of the control circuit 80 illustrated in FIG. 7. The control circuit 80 illustrated in FIG. 8 includes a RIP processing unit 100 which performs a RIP processing on image data to form binary image data; a three-dimensional shape generation unit 102 which forms a three-dimensional shape for each dot from the binary image data; a laser intensity calculation unit 104 which calculates the amount (intensity) of the laser beam emitted for each pixel from the three-dimensional shape; a main scanning parameter generation unit 106 which generates an operation parameter for the main scanning motor (reference numeral 51 in FIG. 7) based on the image data; and a sub-scanning parameter generation unit 108 which generates an operation parameter for the sub-scanning motor (reference numeral 43 in FIG. 7) based on the image data.

The three-dimensional shape generation unit 102 and the laser intensity calculation unit 104 serve as an engraving signal conversion unit 110 which converts the image data to an engraving signal (signal for controlling the amount of light emitted from the semiconductor laser (reference numeral 21 in FIG. 1)). Moreover, the operation parameters generated by the main scanning parameter generation unit 106 and the sub-scanning parameter generation unit 108 are sent to the main scanning motor drive circuit (reference numeral 81 in FIG. 7) and the sub-scanning motor drive circuit (reference numeral 82 in FIG. 7) respectively.

Figure 9:
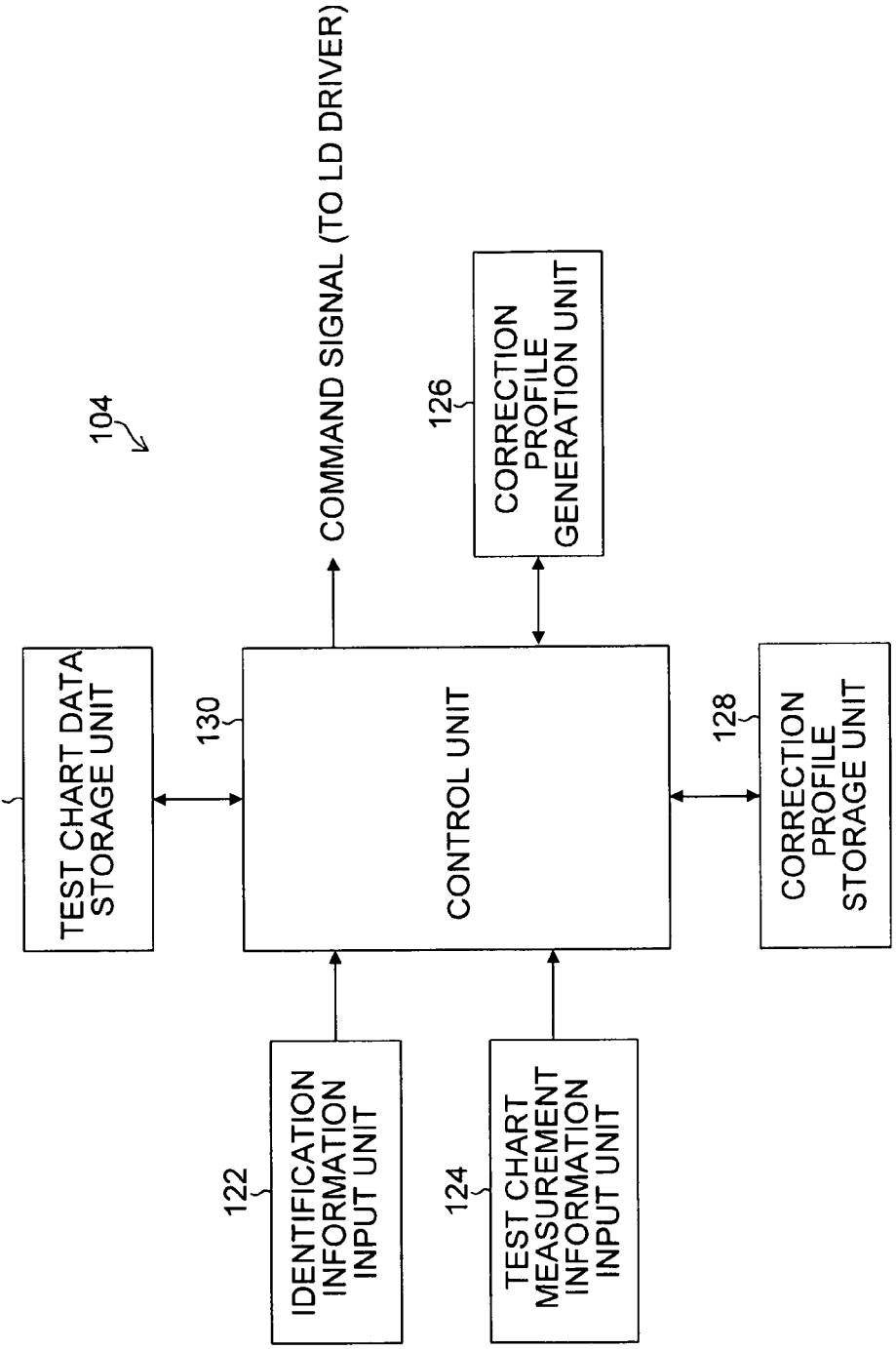
FIG. 9 is a block diagram illustrating a configuration of a laser intensity calculation unit illustrated in FIG. 8.

FIG. 9 is a block diagram illustrating a configuration of a laser intensity calculation unit 104 illustrated in FIG. 8. The laser intensity calculation unit 104 illustrated in FIG. 9 is configured to include a test chart data storage unit 120 which stores test chart data (profile used as the base) used to generate a test chart; an identification information input unit 122 which inputs identification information such as a plate type and a lot when the test chart is generated; a test chart measurement information input unit 124 which inputs test chart measurement information; a correction profile generation unit 126 which generates a correction profile; a correction profile storage unit 128 which stores identification information and the correction profile by associating them; and a control unit 130 which integratedly controls each unit constituting the laser intensity calculation unit 104.

Note that the control unit 130 illustrated in FIG. 9 may integratedly control the control system illustrated in FIG. 7 and the control circuit 80 illustrated in FIG. 8.

<Description of the Laser Engraving>

Here, a flow of the laser engraving applied to the plate-making apparatus 11 in accordance with the present embodiment will be briefly described.

Figure 10:
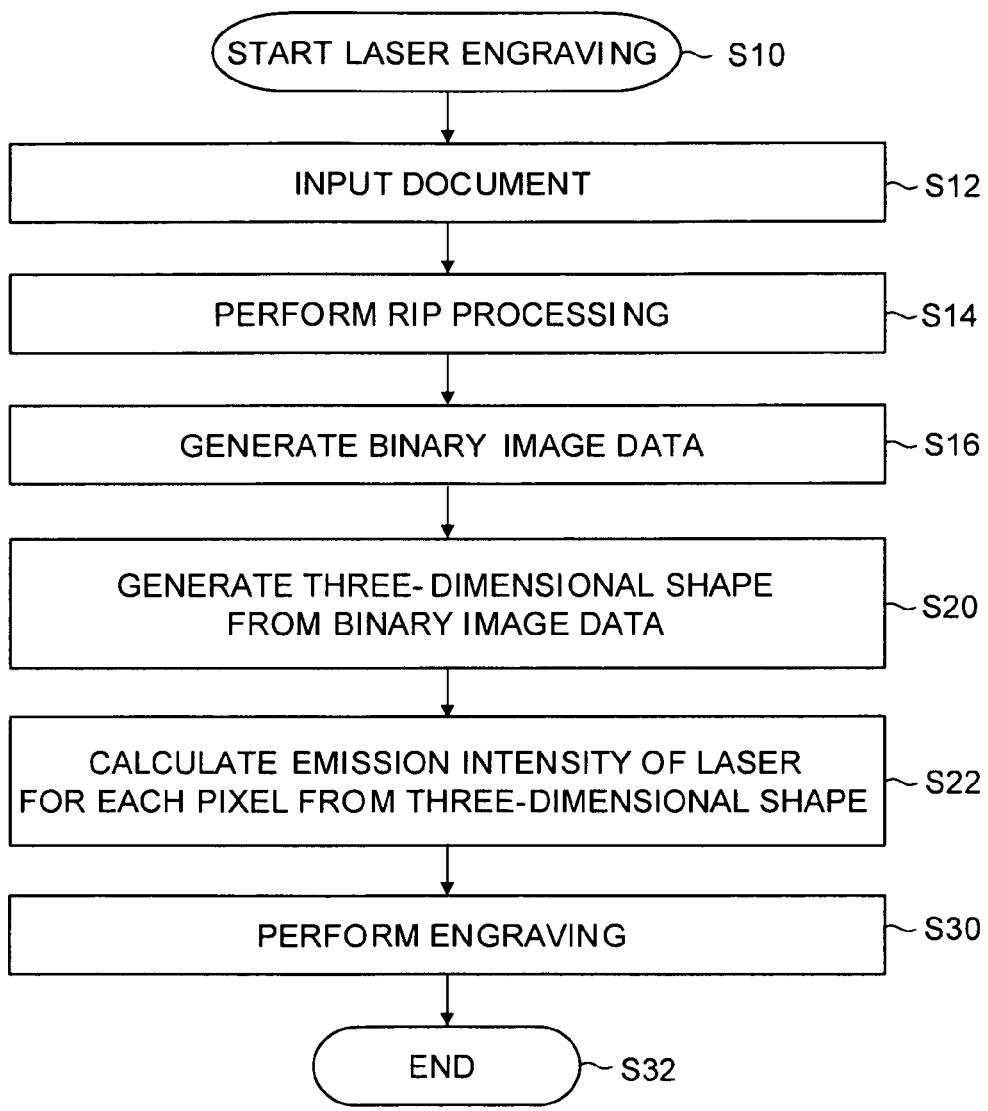
FIG. 10 is a flowchart illustrating a flow of laser engraving.

FIG. 10 is a flowchart illustrating a flow of laser engraving. When laser engraving starts, a document (image data) is inputted (Step S12); RIP (Raster Image Processor) processing is performed on the image data (Step S14); and binary image data (dot data) are generated (Step S16). Up to here, the process is the same as that of a general printer.

When binary image data is generated in Step S16, the process moves to the signal conversion process. That is, a three-dimensional shape is generated from the binary image data (Step S20); and then the intensity (emission amount) of the laser emitted for each pixel from the three-dimensional shape is calculated (Step S22).

When the emission amount for each dot is calculated in Step S22, engraving is performed to produce a plate having a desired three-dimensional shape (Step S30), and then the laser engraving terminates (Step S32).

Figure 11:
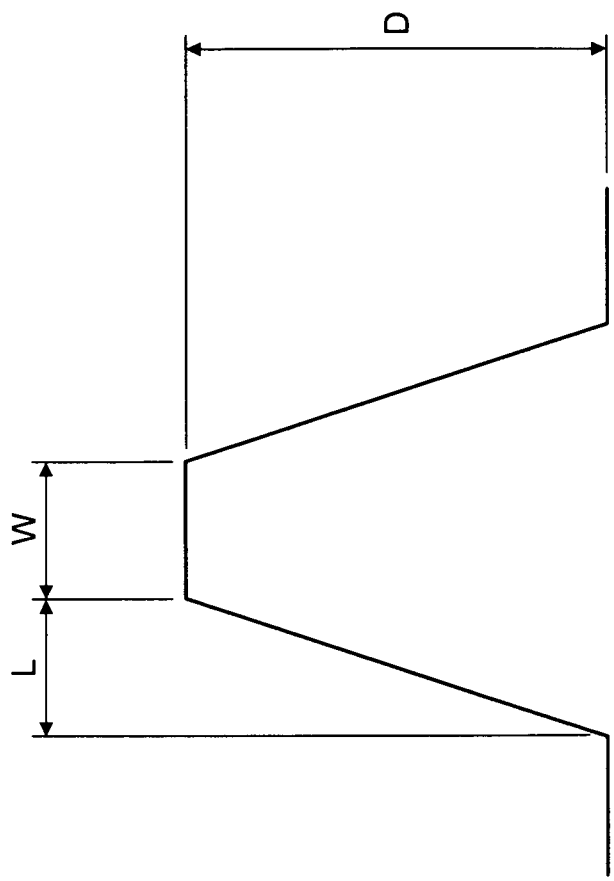
FIG. 11 explains a three-dimensional shape.

FIG. 11 is an explanatory drawing schematically illustrating a three-dimensional shape configuring a printing plate. In FIG. 11, reference character W designates the size (width) of the top portion, reference character D designates the depth thereof, and the reference character L designates the inclined expansion thereof. These are used as the parameters to determine the three-dimensional shape for each dot.

FIGS. 12A to 12F are explanatory drawings illustrating a method of generating a three-dimensional shape from binary image data. One section in a grid in FIGS. 12A to 12F designates a pixel and four pixels having "1" in FIG. 12A constitute one dot.

Figure 12B:
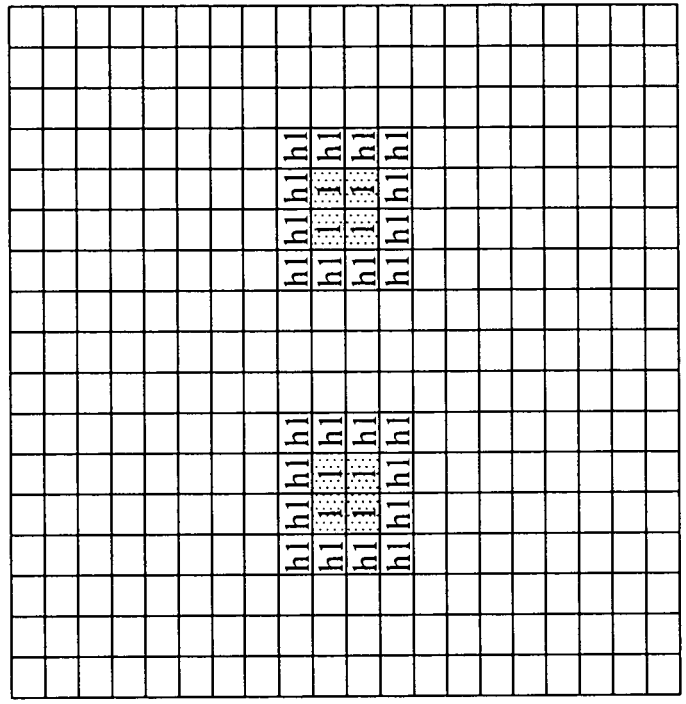
Figure 12A:
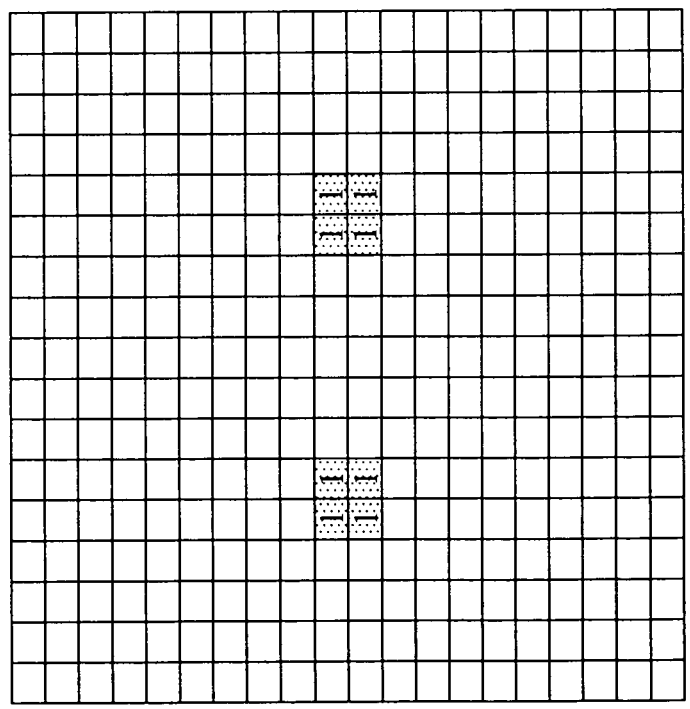

That is, FIG. 12A illustrates binary image data consisting of two dots. When an expansion filter such as a dilation filter is applied, the pixels h1 around the image (dot) are determined as illustrated in FIG. 12B. Then, the depth of h1 is calculated from the angle of inclination given as a parameter (FIG. 12B).

Figures 12C, 12D:
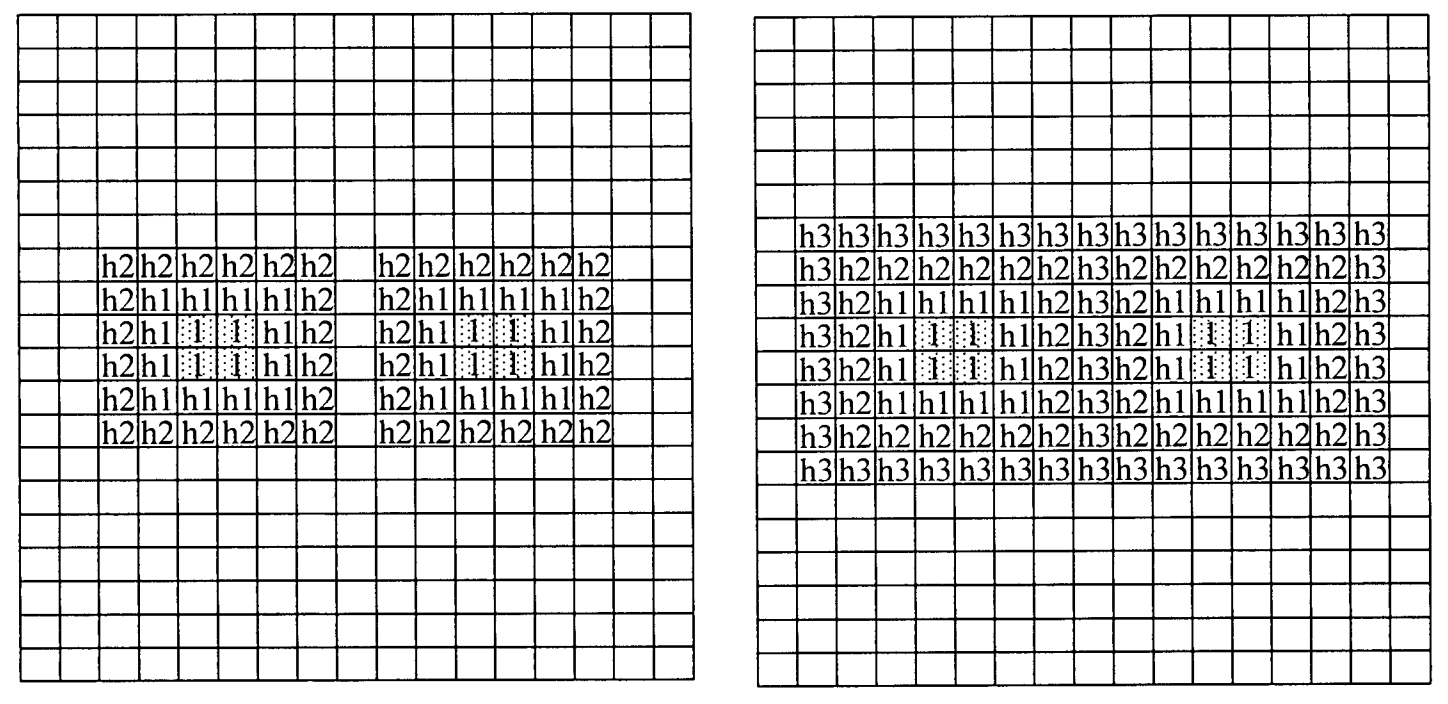
Figures 12E, 12F:
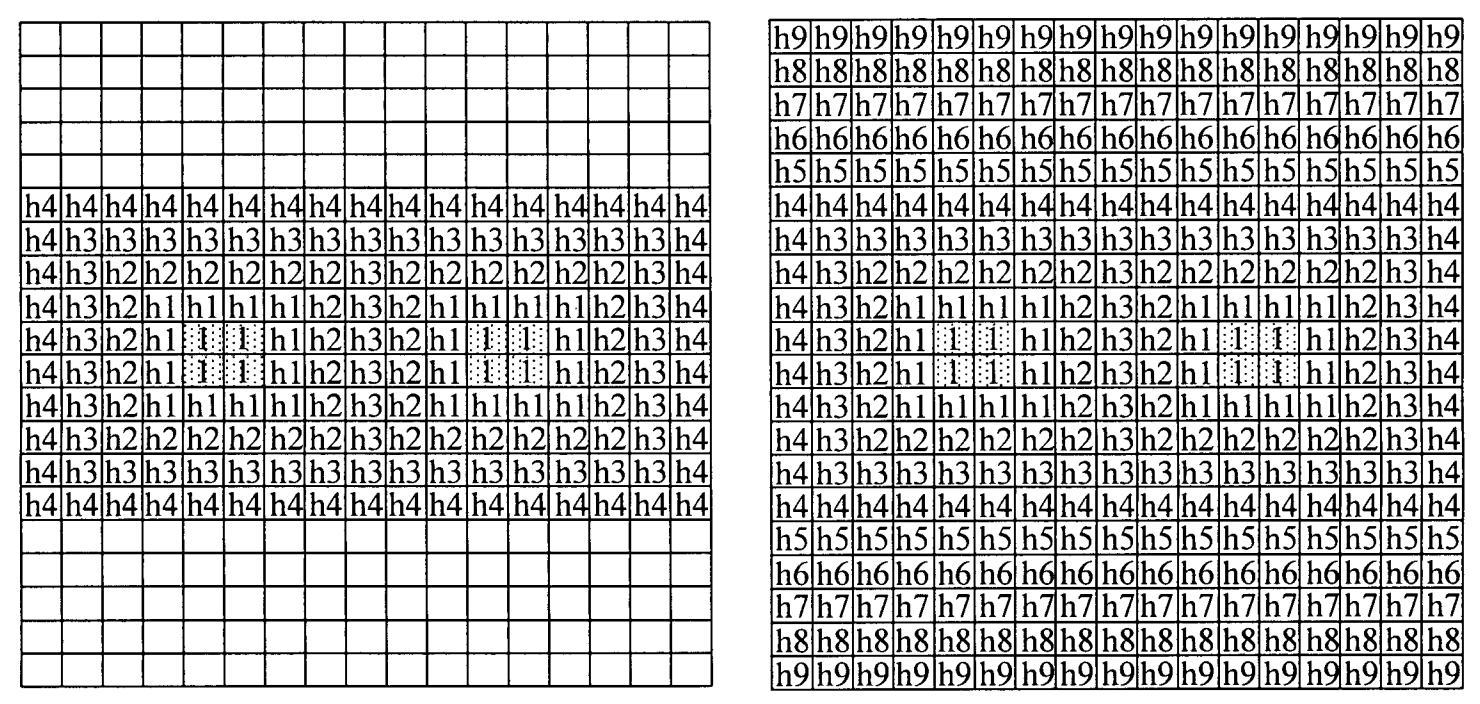

Further, with respect to an image where pixels up to h1 have been calculated, the expansion filter is used to determine pixel h2 around the image and calculate the depth of h2 (FIG. 12C). Likewise, with respect to the image where pixels up to h2 have been calculated, the expansion filter is used to determine pixel h3 around the image and calculate the depth of h3 (FIG. 12D). Further, h4 is determined with respect to h3 and the depth of h4 is calculated (FIG. 12E). Such processes are repeated n number of times to determine hn and calculate the depth of hn (FIG. 12F).

Here, the value to be set to n is determined by the depth of the three-dimensional shape (reference character D in FIG. 11) and the inclined expansion (reference character L in FIG. 11). For example, in order to perform engraving with a depth of 500 μm, an inclined expansion of 25 μm, and a resolution of 2400 dpi, n should be about 25 pixels. Note that this value is for general flexo plates, and the depth may be greater than 500 μm depending on the application (e.g., material of the printing medium).

Figure 14A:
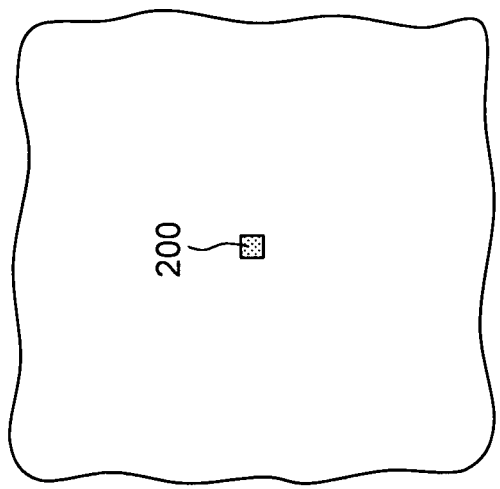
FIGS. 14A and 14B each explain the relationship between the dot arrangement and the three-dimensional shape (for one dot)
Figure 14B:
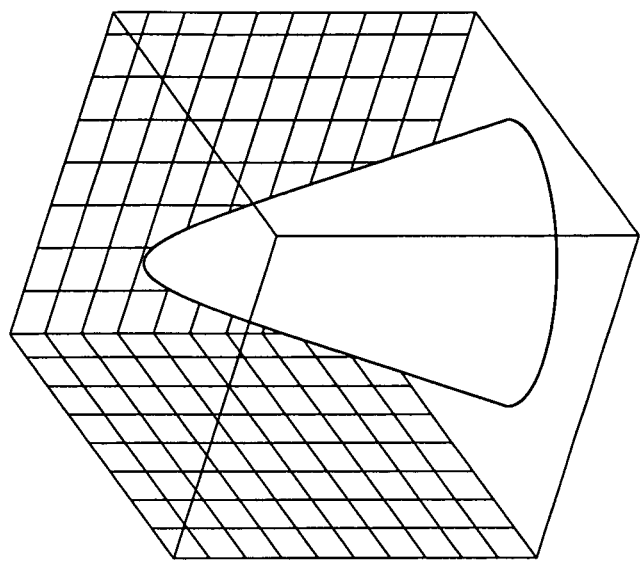

FIGS. 13A and 13B and FIGS. 14A and 14B each explain the relationship between binary image data and the three-dimensional shape. FIG. 13A illustrates a plurality of dots 200 arranged in a matrix. FIG. 13B is a perspective view illustrating a three-dimensional shape corresponding to the binary image data illustrated in FIG. 13A. FIG. 14A illustrates one dot 200. FIG. 14B illustrates a three-dimensional shape corresponding to the binary image data illustrated in FIG. 14A.

<Specific Example of Printing Plate Manufacturing Method>

Hereinafter, a procedure for the printing plate manufacturing method in accordance with an embodiment of the present invention will be described. The printing plate manufacturing method in accordance with the present embodiment mainly includes "a step of performing a test engraving (test chart generation), "a step of generating a correction profile" and "a step of performing actual engraving".

Figure 15:
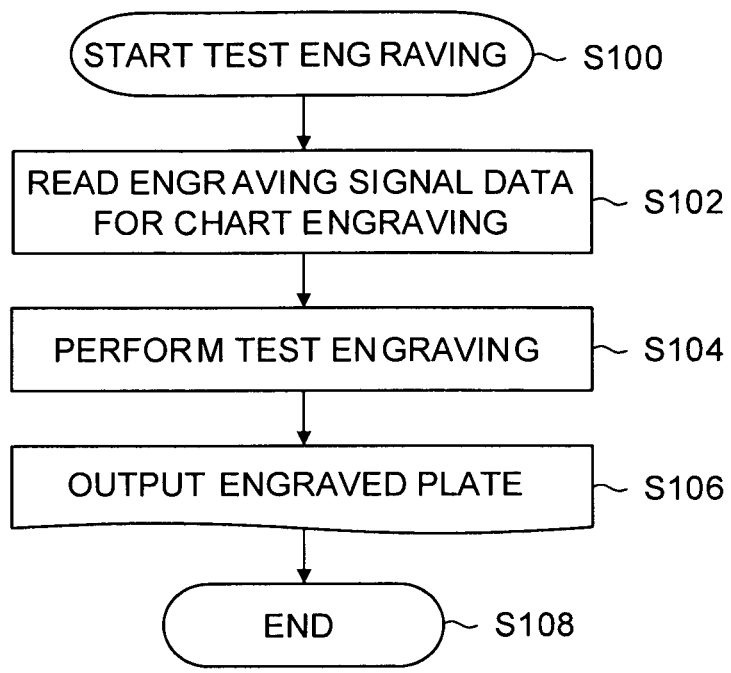
FIG. 15 is a flowchart illustrating a flow of test engraving.

FIG. 15 is a flowchart of the step of performing a test engraving (test chart generation). The test engraving is performed when the plate material type is changed, the lot is changed, and a user command is entered.

When the test engraving starts (Step S100), engraving signal data for chart engraving stored in the test chart data storage unit (reference numeral 120 in FIG. 9) is read (Step S102 in FIG. 15), and the test engraving is performed (Step S104). Then, an engraved plate is produced (outputted) by the test engraving (Step S106), and the step of performing the test engraving terminates (Step S108).

In the step of performing the test engraving illustrated in FIG. 15, when the engraved test plate (engraved plate) is produced, the process moves to the process of generating a correction profile.

Figure 16:
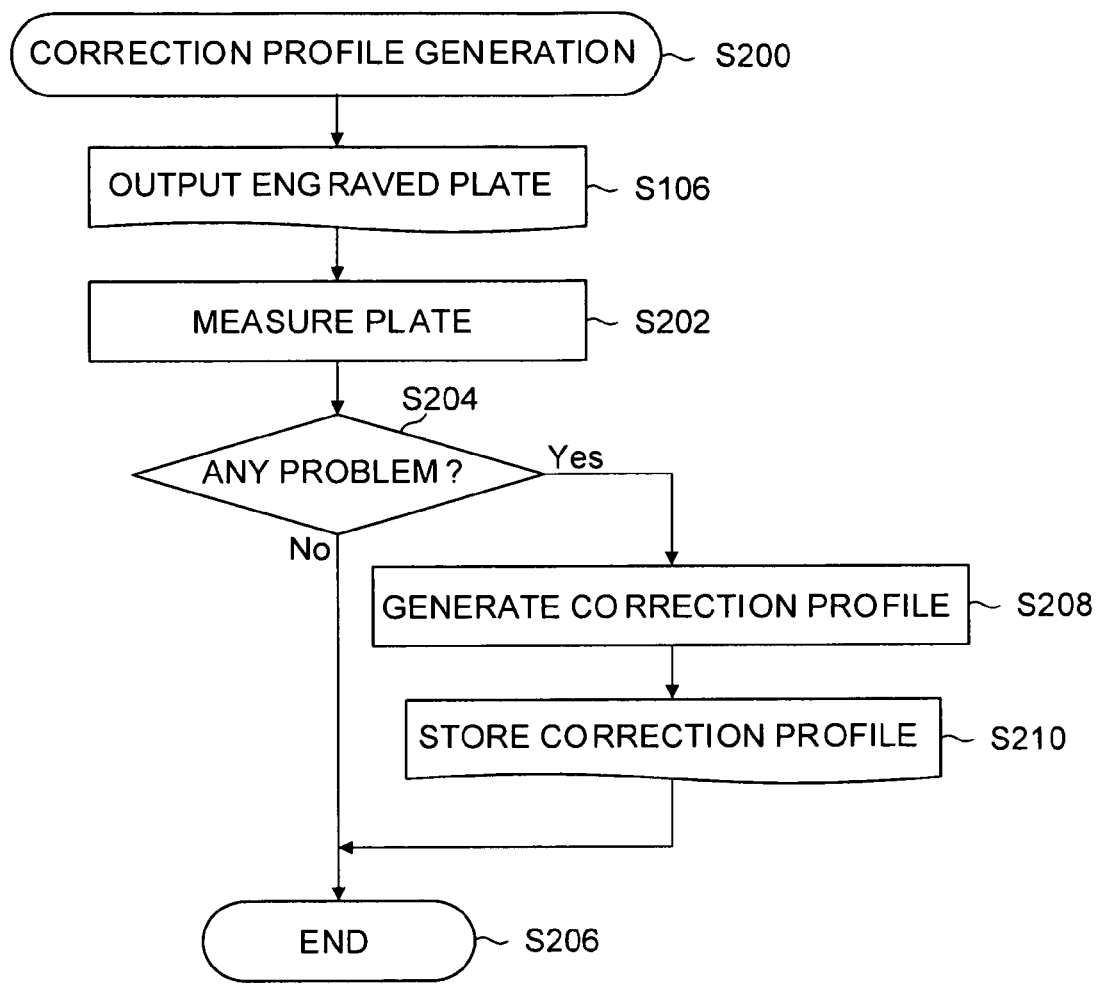
FIG. 16 is a flowchart illustrating a flow of correction profile generation.

FIG. 16 is a flowchart illustrating a process of generating a correction profile. When the process of generating a correction profile illustrated in FIG. 16 starts (Step S200), the engraved plate outputted in Step S106 of FIG. 15 is measured (Step S202).

For the measurement in Step S202, only the size (reference character W in FIG. 11) of the top portion of the three-dimensional shape may be measured, or the inclined expansion (reference character L in FIG. 11) and the depth (reference character D in FIG. 11) may be measured; and the object to be measured can be selected as needed depending on the measurement method (measurement apparatus). Examples of measurement methods include taking an image by a camera, visually checking by magnifying the image with a loupe and the like, and using a three-dimensional measuring instrument.

When the engraved test plate measurement is completed, a determination is made in Step S204 as to whether or not the plate is produced as intended (a determination is made based on the image data as to whether or not the desired shape is generated). If a determination is made in Step S204 that the engraved test plate is produced without any problem and is produced as intended (Step S204: YES), no correction profile is generated and the process terminates (Step S206). On the other hand, a determination is made in Step S204 that the engraved test plate has a problem and the engraved test plate is not produced as intended (Step S204: NO), a correction profile is generated based on the measurement result of the engraved test plate (Step S208), and the correction profile is stored in a predetermined memory (Step S210).

The judgment criteria in Step S204 may be set by the user via a predetermined user interface or may be set in advance according to the types of the plate material. When the step of generating a correction profile illustrated in FIG. 16 is completed, the process moves to a step of performing actual engraving.

Figure 17:
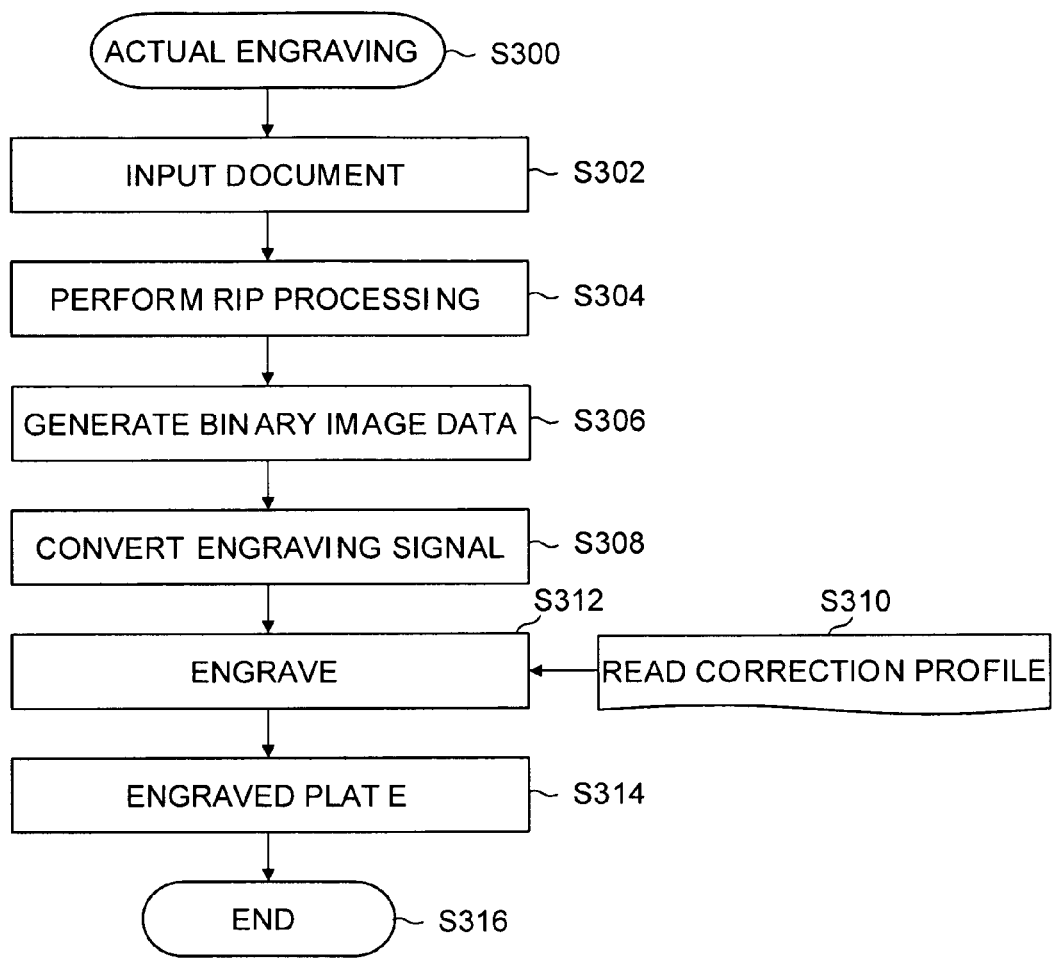
FIG. 17 is a flowchart illustrating a flow of actual engraving.

FIG. 17 is a flowchart illustrating a step of performing actual engraving. When the step of performing actual engraving illustrated in FIG. 17 starts (Step S300), a document (image data) is inputted (Step S302); a RIP processing is performed on the image data (Step S304); and binary image data is generated (Step S306).

Further, the binary image data is converted to an engraving signal (Step S308). The process in Step S308 of FIG. 17 includes the process of generating the three-dimensional shape (Step S20) and the process of calculating the laser intensity (Step S22) in FIG. 10.

When the engraving signal is generated in Step S308 of FIG. 17, if the correction profile is generated and stored in Step S208 to Step S210 of FIG. 16, the correction profile is read (Step S310) as well as the engraving signal is corrected based on the correction profile and the actual engraving is performed (Step S312). On the other hand, if the correction profile is not generated (stored), the engraving signal is not corrected (default profile is used) and the actual engraving process is performed (Step S312).

When a predetermined printing plate (engraved plate) is produced in this manner (Step S314), the actual engraving terminates (Step S316).

Figure 18:
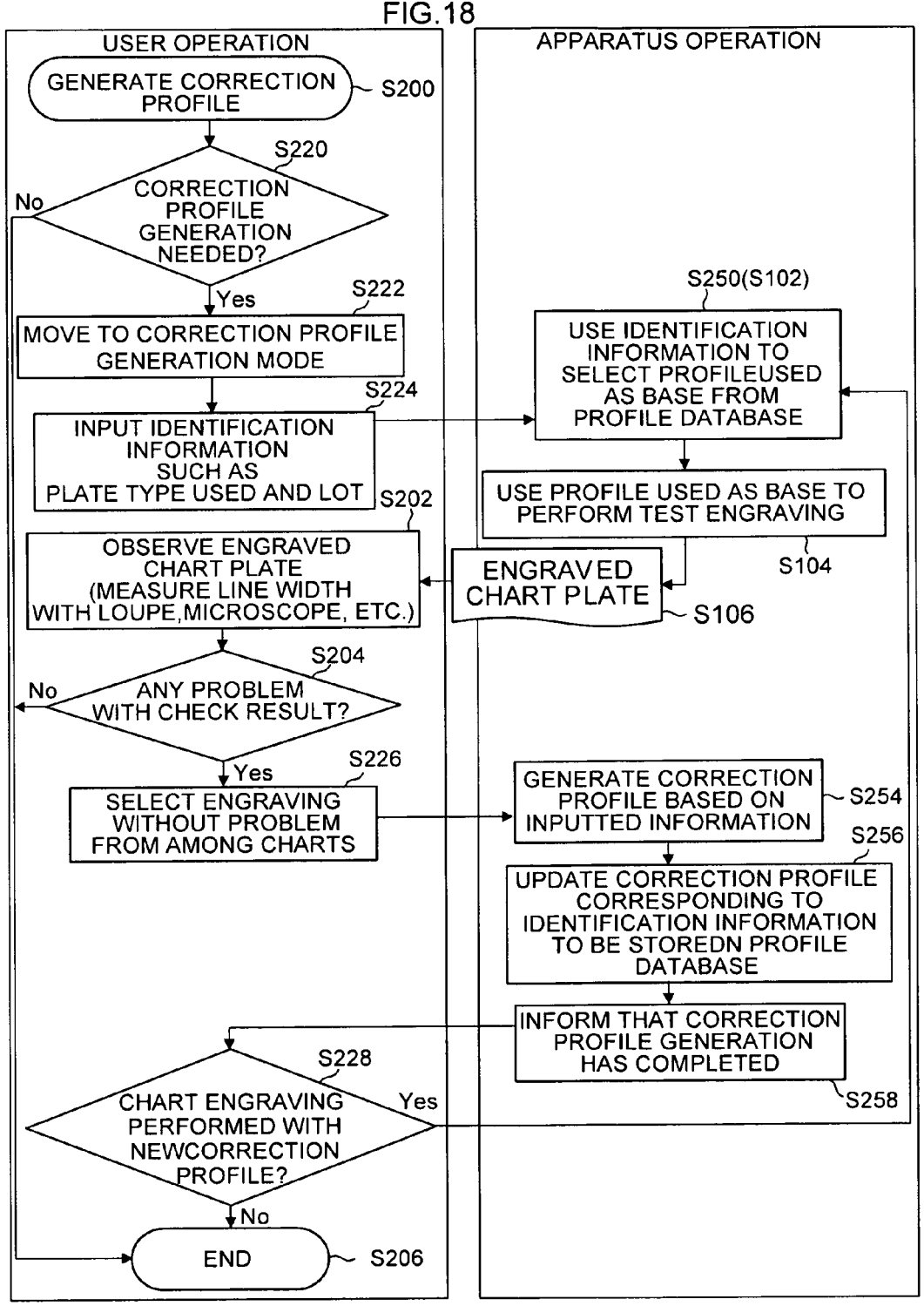
FIG. 18 is a flowchart illustrating a detailed flow of correction profile generation.

FIG. 18 is a flowchart illustrating the relationship between the user operation and the apparatus control in the test engraving process and the correction profile generation process illustrated in FIGS. 15 and 16 respectively. Note that in FIG. 18, the same reference numerals or characters are assigned to the parts which are the same as or similar to those in FIGS. 15 and 16, and the description thereof is omitted.

When the correction profile generation process starts (Step S200), the user determines whether or not a correction profile needs to be generated (Step S220). For example, the user determines whether or not a correction is needed when the plate material lot is changed, an aging variation of the plate is expected, a fine line cannot be drawn as intended, the image quality of the already produced plate is deteriorated, or the like.

If the user determines that no correction is needed (Step S220: NO), the correction profile generation process terminates (Step S206). On the other hand, if the user determines that a correction is needed (Step S220: YES), the correction profile generation process is performed (Step S222). Then, the user inputs identification information such as the type of the plate used and the lot (Step S224).

Examples of the aspect of inputting identification information include an aspect of inputting by operating a touch panel display apparatus and an aspect of reading information using a reading device such as an IC tag and a bar code reader. The identification information input unit 122 in FIG. 9 is applied to the device for inputting such identification information.

When the user operates the correction profile generation (Step S222 in FIG. 18), and inputs identification information (Step S224), the apparatus uses the identification information to read a profile used as a base for performing a test engraving (Step S250).

The profiles used as the base are stored in the test chart data storage unit 120 (profile database) of FIG. 9 for each plate type in a database format. In addition, the already generated correction profiles are stored in the correction profile storage unit 128 of FIG. 9. Therefore, one of the already generated correction profiles can also be selectively used by referring to the correction profile storage unit 128. Note that Step S250 of FIG. 18 corresponds to Step S102 of FIG. 15.

When the profile used as the base is selected in Step S250, the profile is used to perform a test engraving (chart engraving) (Step S104). This process corresponds to Step S104 of FIG. 15.

In Step S104 of FIG. 18, when the apparatus outputs an engraved test plate (chart plate) (Step S106), the user performs measurement (observation) on the engraved test plate (Step S202). Note that Step S106 of FIG. 18 corresponds to Step S106 of FIG. 15.

If the user determines that the engraved test plate has no problem (Step S204: NO) as a result of measurement in Step S202 of FIG. 18, the correction profile generation process terminates (Step S206). On the other hand, if the user determines that the engraved test plate has a problem (Step S204: YES), the user select appropriate engravings (shapes) from the engraved test plate and inputs the selection information to the apparatus (Step S226). Note that "selection of the most appropriate engraved shape" in Step S226 will be described later.

When the selection information is acquired, the apparatus generates the correction profile based on the selection information (Step S254). Further, the apparatus associates the correction profile with the identification information inputted in Step S224 and stores the associated correction profile in a predetermined memory (correction profile storage unit 128 in FIG. 9) (Step S256).

Note that if there is an already generated correction profile in the memory, the content thereof is updated. As the method of updating the storage content, data of the already generated correction profile may be overwritten with data of this newly generated correction profile or a version may be added to each profile and this correction profile may be stored separately with the version added. When the correction profile is stored (updated) in Step S256, the apparatus informs that the correction profile generation has completed (Step S258).

When the user is informed that the correction profile generation has completed in Step S258, the user determines whether or not to perform a test engraving with a new correction profile (Step S228). If the user determines not to perform a test engraving with a new correction profile (Step S228: NO), the process proceeds to Step S206, where the correction profile generation process terminates. On the other hand, if the user determines to perform a test engraving with a new correction profile (for example, in order to confirm the quality of engraving with a new profile just in case), the user inputs the information to the apparatus. Then, the apparatus control returns to Step S250, where the process from Step S250 is repeated.

<Description of an Engraved Shape Selection>

Next, the description will focus on the selection of the most appropriate engraved shape in a test chart (Step S226 of FIG. 18).

Figure 19:
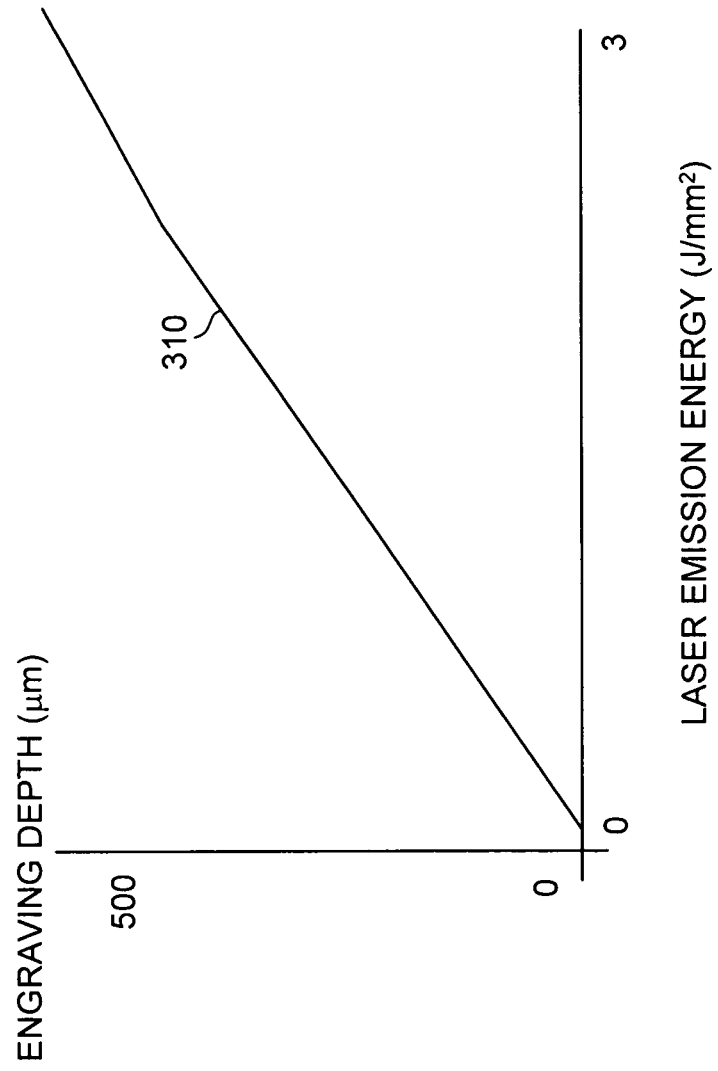
FIG. 19 illustrates an example of a sensitivity characteristic curve of a plate material.

FIG. 19 illustrates a characteristic curve 310 illustrating the relationship between the laser emission energy ($J/mm^2$) and the engraving depth (reference character D in FIG. 11) (illustrates an example of characteristics of the plate material). The sensitivity of the plate material illustrated in FIG. 19 often differs depending on the plate material lot. FIG. 20 illustrates an example of a difference in sensitivity of the plate material due to a difference in the plate material lot.

The characteristic curve 310 illustrated in FIG. 20 is the same as characteristic curve 310 illustrated in FIG. 19. There may be other characteristic curves such that the characteristic curve 312 differs in inclination due to the difference in the plate material lot; and the characteristic curve 314 differs in the offset and the γ characteristic from the characteristic curve 310.

That is, even if laser beams are adjusted using a plate material having a characteristic (here, sensitivity profile) so as to correctly engrave a target shape, if the plate material of a different lot is used, the engraved shape may be shifted from the target shape due to the difference in the characteristic such as sensitivity.

For example, assume that an attempt is made to obtain a shape 320 illustrated by dotted lines in (a) portion of FIG. 21 using a plate material having a sensitivity characteristic. In order to do this, the amount of laser beam is adjusted to reference numeral 330 in (b) portion of FIG. 21. At this time, if the plate material to be engraved has a higher sensitivity than that of the plate material used to adjust the amount of laser beam, it results in engraving a shape 322 illustrated by solid lines in (a) portion of FIG. 21. In this case, the emission amount 330 needs to be corrected so as to cancel the difference in sensitivity of the plate material.

(a) portion of FIG. 22 illustrates a target shape 320 illustrated by dotted lines in (a) portion of FIG. 21. In order to obtain such a target shape 320, the amount of laser beam is adjusted in such a manner that the default emission amount 330 illustrated by dotted lines in (b) portion of FIG. 22 should be equal to the emission amount 332 illustrated by solid lines. That is, a correction profile is generated according to the difference in characteristic (sensitivity) of the plate material. Then, the target shape 320 can be obtained by emitting laser beams based on the correction profile.

Figure 23A:
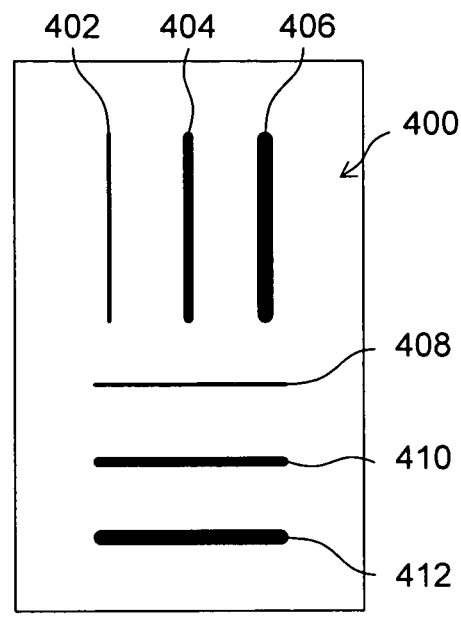
FIGS. 23A and 23B each explain a configuration example of the test engraving.
Figure 23B:
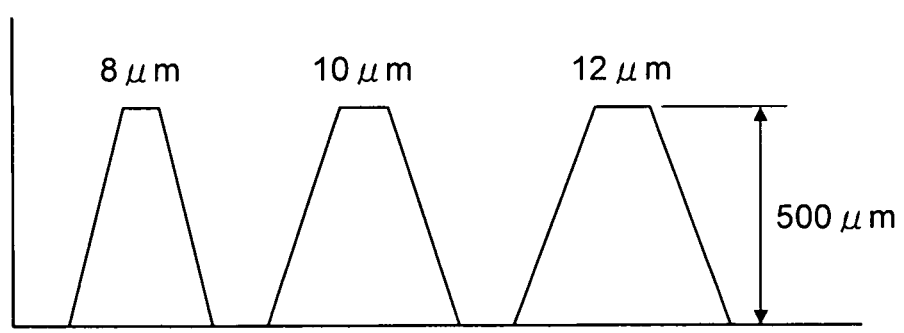

FIGS. 23A and 23B each illustrate an example of the test engraving (chart engraving). FIG. 23A is a plan view of an engraved test plate 400. FIG. 23B is a sectional view (schematic view illustrating a three-dimensional shape) of FIG. 23A.

As illustrated in FIG. 23A, a plurality of three-dimensional shapes 402 to 412 each having a different size (line width) of the top portion are formed on the engraved test plate 400. More specifically, the engraved test plate 400 illustrated in FIG. 23A includes three-dimensional shapes 402 and 408 whose size of the top portion is 8 μm; three-dimensional shapes 404 and 410 whose size of the top portion is 10 μm; and three-dimensional shapes 406 and 412 whose size of the top portion is 12 μm. Note that as illustrated in FIG. 23B, each of the three-dimensional shapes 402 to 412 has a depth of 500 μm.

That is, a standard plate material is used to perform several kinds of engraving using signals: one for engraving a shape whose size of the top portion is 10 μm; one for increasing the emission amount (intensity) of laser beam a little more than the first one; and one for decreasing the amount (intensity) of laser beam a little the first one. In the present embodiment, the shapes are formed so that the size of the top portion should be ±2 μm with respect to the target size (10 μm).

The laser beam profile used for test engraving using the standard plate material corresponds to the "profile used as the base" written in Step S250 of FIG. 18, which is associated with information of the standard plate material and stored in the profile database.

An engraved test plate is produced by using the above signals to engrave a plate material that the user has. Then, a measurement is made on the shapes formed on the engraved test plate (here, only the width of the top portion is measured). As a result, an assumption is made such that the top portion of the three-dimensional shape 402 (408) illustrated in FIG. 23A has a size of 6 μm, the top portion of the three-dimensional shape 404 (410) has a size of 8 μm, and the top portion of the three-dimensional shape 406 (412) has a size of 10 μm.

It is understood from the aforementioned measurement results that the plate material of the user has a slightly higher sensitivity than that of the standard plate material. In light of this, a correction profile needs to be generated. When the actual engraving (see FIG. 17) is performed, the amount of laser light needs to be controlled based on the correction profile. In other words, this corresponds to a case where YES is determined in Step S204 of FIG. 18.

Here, when a correction profile is generated, attention should be paid to the fact that a desired size (10 μm) is found in an engraving. Therefore, the desired shape can be obtained by applying, to the actual engraving, the amount of laser light used when this desired shape is engraved. That is, the user selects a shape closest to the target shape from the measurement results of several shapes formed on the engraved test plate. That is, the user selects the three-dimensional shape 406 (412) formed on the engraved test plate 400 illustrated in FIG. 23A.

Figure 24:
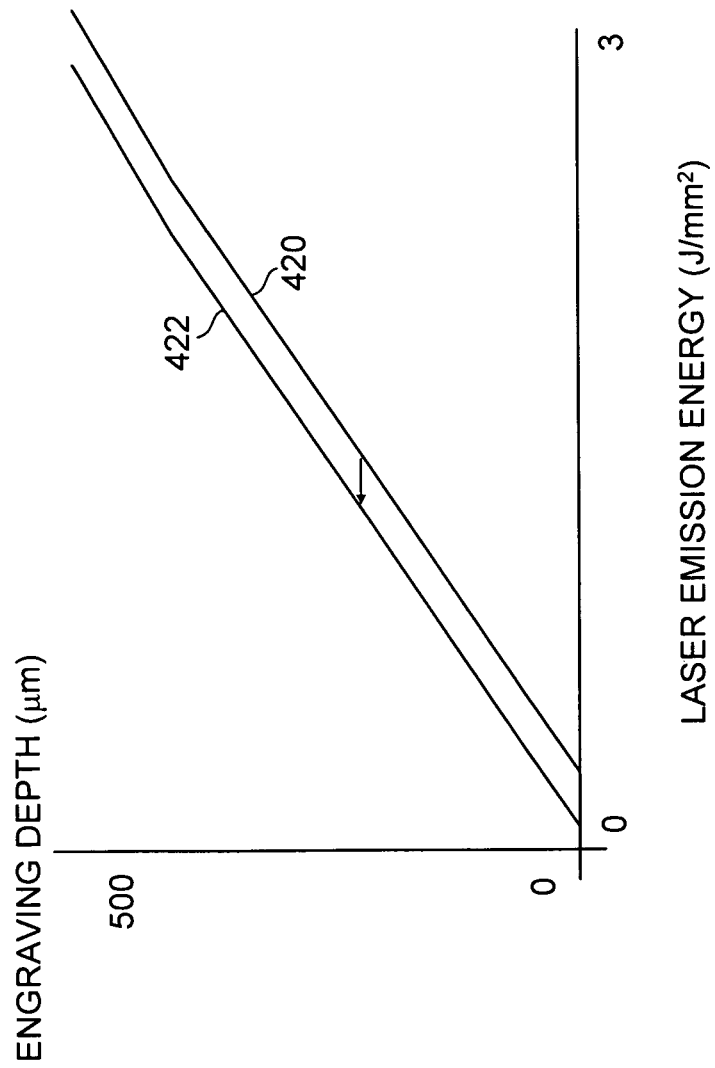
FIG. 24 explains an example of modifying the characteristic curve of the plate material.

When the selection information is acquired from the user side, the apparatus side uses this information to correct the sensitivity characteristic curves (for example, the characteristic curves 310 to 314 illustrated in FIG. 20) of the plate material. FIG. 24 illustrates an example of modifying the characteristic curve.

In FIG. 24, the sensitivity characteristic curve 420 indicates that a standard shape is engraved on the standard plate material. The modified sensitivity characteristic curve 422 is obtained by parallel-moving the sensitivity characteristic curve 420 with respect to the laser emission energy axis. It should be noted that the present embodiment illustrates an aspect of measuring only the size of the top portion to generate the correction profile, but it is also possible to provide an aspect where a measurement apparatus capable of measuring a three-dimensional shape such as a three-dimensional microscope is used to measure the inclined shape and the depth and thereby not only the correction by parallel moving but also a nonlinear correction using the difference of γ and the like.

Moreover, the present embodiment illustrates the sensitivity characteristic curve of the plate material as an example of the correction profile, but other factors such as a thermal conductivity, a heat-storage capacity, an engraved pattern of pixels around a focused pixel may be considered.

<Other Application Examples>

The present invention can be applied not only flexographic plates but also other relief printing plates or intaglio printing plates. Moreover, the present invention can be applied to not only printing plate manufacturing apparatuses but also drawing/recording apparatuses for various applications and engravers.

<Appendix>

As has become evident from the above detailed description of the embodiments of the present invention, the present specification includes disclosure of various technical ideas including the invention as follows.

(First Invention)

A plate-making apparatus comprising:

an exposure head which engraves a surface of a plate material by emitting a light beam toward the plate material;

a scanning device which performs exposure scanning by relatively moving the plate material and the exposure head;

a correction profile generation device which generates a correction profile for correcting the amount of light emitted by the exposure head according to a characteristic difference of the plate material; and an exposure control device which, when a correction profile for a plate material to be used is generated by the correction profile generation device, uses the correction profile for the plate material to be used to control the amount of the light beam.

According to the present invention, when a correction profile for the plate material according to a characteristic difference of a plate material used as a printing plate is generated, the correction profile is used to correct the amount of the light beam emitted from the exposure head and engrave the plate material. Therefore, a fine shape can be engraved as intended even if the plate material is changed due to lot differences.

The correction profile in accordance with the present invention is a concept including a characteristic curve represented by the relationship between a laser beam emission energy and an engraved shape (such as the depth).

(Second Invention)

The plate-making apparatus according to the first invention, further comprising an identification information acquisition device which acquires identification information which includes at least one of the type and the lot of the plate material to be used when the correction profile is generated.

According to the above aspect, variations of engraved shapes caused by a characteristic difference of a plate material due to differences in type of the plate material and differences in lot can be corrected, thereby enabling generation of a preferred printing plate.

The above aspect can also be configured such that the above aspect further includes an instruction device (user interface) which allows the user to instruct the apparatus whether or not to generate a correction profile for the plate material to be used and allows the user to input an instruction to generate the correction profile as well as allows the user to input identification information to the apparatus.

(Third Invention)

The plate-making apparatus according to the second invention, further comprising a correction profile storage device which associates the correction profile with the identification information and stores the correction profile and the identification information.

According to the above aspect, a desired correction profile can be easily retrieved from the identification information, and if the correction profile corresponding to the identification information is stored, the correction profile stored in the correction profile storage device can be used.

When a correction profile is newly generated by similar identification information, a stored correction profile may be overwritten with the newly generated correction profile or an identifier such as a version is added to the newly generated correction profile and then the newly generated correction profile with the identifier added may be stored separately.

(Fourth Invention)

The plate-making apparatus according to any one of the first to third inventions, wherein the correction profile generation device generates a correction profile for correcting a difference in sensitivity characteristic of the plate material with respect to the light beam.

According to the above aspect, a preferable correction profile can be generated based on an easily measurable indicator.

The correction profile can also be generated based on the characteristics not only the sensitivity characteristic but also a nonlinear characteristic such as a γ characteristic.

(Fifth Invention)

The plate-making apparatus according to any one of the first to fourth inventions, further comprising a storage device which stores test engraving data for engraving a test engraving, wherein the exposure control device controls the amount of light emitted by the exposure head based on the test engraving data when test engraving is engraved, and the correction profile generation device generates a correction profile based on the result of measuring the test engraving.

According to the above aspect, a test engraving (test chart) is generated and a correction profile is generated based on the result of measuring the test engraving. Therefore, the individual difference of the plate material can be understood more accurately and thus a preferred correction profile can be generated.

For measuring the test engraving, a preferred aspect is to measure the width of a top portion of a shape contained in the test engraving.

(Sixth Invention)

The plate-making apparatus according to the fifth invention, wherein the test engraving includes a plurality of shapes engraved by changing emission conditions of the emission amount, and the correction profile generation device generates a correction profile based on an emission condition corresponding to a shape closest to a target among the plurality of shapes.

For the plurality of shapes according to the above aspect, a preferred aspect is that the plurality of shapes include a plurality of shapes which are different in the width of the top portion for each shape and the correction profile includes a condition when a shape having a desired width is generated.

(Seventh Invention)

A printing plate manufacturing method comprising an engraving step of engraving a surface of a plate material by emitting a light beam toward the plate material from an exposure head by relatively moving the plate material for producing a printing plate and the exposure head which emits the light beam toward the plate material; and a correction profile generation step of generating a correction profile for correcting the emission amount of the light beam according to an individual difference of the plate material, wherein the engraving step is to engrave a desired shape on the plate material by controlling the emission amount of the light beam using the correction profile.

A preferred aspect is that the present invention includes a step of generating a test engraving and a step of measuring the test engraving, and a preferred aspect of the step of generating the test engraving is that a correction profile is generated based on the measurement result of the step of measuring the test engraving.

Moreover, the invention in accordance with the printing plate manufacturing method can be configured as a printing plate manufacturing program capable of causing a computer to execute the each step.

What is claimed is:

1. A plate-making apparatus comprising:
an exposure head which engraves a surface of a plate material by emitting a light beam toward the plate material;
a scanning device which performs exposure scanning by relatively moving the plate material and the exposure head;
a correction profile generation device which generates a correction profile for correcting an emission amount of the light beam emitted by the exposure head according to a characteristic difference of the plate material;
an exposure control device which, when a correction profile for a plate material to be used is generated by the correction profile generation device, uses the correction profile for the plate material to be used to control the emission amount of the light beam; and
an identification information acquiring device which acquires identification information including a plate type and a production lot of a plate material to be used when the correction profile generation device generates the correction profile, wherein the correction profile generation device generates the correction profile based on the identification information including the plate type and the production lot of the plate material to be used.

2. The plate-making apparatus according to claim 1, further comprising a correction profile storage device which associates the correction profile with the identification information and stores the correction profile and the identification information.

3. The plate-making apparatus according to claim 1, wherein the correction profile generation device generates a correction profile for correcting a difference in sensitivity characteristic of the plate material with respect to the light beam.

4. The plate-making apparatus according to claim 2, wherein the correction profile generation device generates a correction profile for correcting a difference in sensitivity characteristic of the plate material with respect to the light beam.

5. The plate-making apparatus according to claim 1, further comprising a storage device which stores test engraving data for engraving a test engraving,
wherein the exposure control device controls the emission amount of the light beam emitted by the exposure head based on the test engraving data when test engraving is engraved, and
the correction profile generation device generates a correction profile based on the result of measuring the test engraving.

6. The plate-making apparatus according to claim 4, further comprising a storage device which stores test engraving data for engraving a test engraving,
wherein the exposure control device controls the emission amount of the light beam emitted by the exposure head based on the test engraving data when test engraving is engraved, and
the correction profile generation device generates a correction profile based on the result of measuring the test engraving.

7. The plate-making apparatus according to claim 5,
wherein the test engraving includes a plurality of shapes engraved by changing conditions of the emission amount, and
the correction profile generation device generates a correction profile based on an emission condition corresponding to a shape closest to a target among the plurality of shapes.

8. The plate-making apparatus according to claim 6,
wherein the test engraving includes a plurality of shapes engraved by changing conditions of the emission amount, and
the correction profile generation device generates a correction profile based on an emission condition corresponding to a shape closest to a target among the plurality of shapes.

9. The plate-making apparatus according to claim 1, wherein the plate type is gum or resin.

10. The plate-making apparatus according to claim 5, wherein the correction profile generation device generates the correction profile based on the result of measurement of the size of a top portion or inclined expansion of the test engraving.

11. The plate-making apparatus according to claim 5, wherein the correction profile generation device generates the correction profile which specifies conversion relationship between the size of the top portion of a standard plate material and the size of the top portion of the test engraving.

* * * * *